US008253812B2

(12) United States Patent
Kurokawa

(10) Patent No.: US 8,253,812 B2
(45) Date of Patent: Aug. 28, 2012

(54) VIDEO CAMERA WHICH ADOPTS A FOCAL-PLANE ELECTRONIC SHUTTER SYSTEM

(75) Inventor: Mitsuaki Kurokawa, Osaka (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 535 days.

(21) Appl. No.: 12/390,585

(22) Filed: Feb. 23, 2009

(65) Prior Publication Data

US 2009/0213231 A1 Aug. 27, 2009

(30) Foreign Application Priority Data

Feb. 23, 2008 (JP) ................................ 2008-042281
Jan. 19, 2009 (JP) ................................ 2009-008455

(51) Int. Cl.
*H04N 5/228* (2006.01)

(52) U.S. Cl. ................................ 348/208.4; 348/208.99

(58) Field of Classification Search ............. 348/208.99, 348/208.1–208.4
See application file for complete search history.

(56) References Cited

U.S. PATENT DOCUMENTS 4,959,725 A * 9/1990 Mandle ...................... 348/208.6
7,518,635 B2 * 4/2009 Kawahara et al. ......... 348/208.6
7,636,106 B2 12/2009 Kumaki
2007/0115364 A1 * 5/2007 Kumaki .................. 348/208.99

FOREIGN PATENT DOCUMENTS

JP 2006-148496 A 6/2006
JP 2007-135056 A 5/2007
JP 2007-166551 A 6/2007
JP 2007-309497 A 11/2007
JP 2009-135713 A 6/2009

OTHER PUBLICATIONS

Japanese Office Action dated Mar. 21, 2012, issued in corresponding Japanese Patent Application No. 2008-042281 with an English language translation.

* cited by examiner

*Primary Examiner* — Kelly L Jerabek

(57) ABSTRACT

A video camera includes an image sensor which repeatedly outputs an object scene image produced on an imaging surface by an exposure operation of a focal-plane electronic shutter system in a raster scanning manner. A post-processing circuit extracts a partial object scene image belonging to an extraction area, out of the object scene image outputted from the image sensor. A moving image based on the extracted partial object scene image is displayed on an LCD monitor by an LCD driver. A motion detecting circuit detects motion of the imaging surface in a direction orthogonal to an optical axis. A position of the extraction area is changed by a CPU so that the motion detected by the motion detecting circuit is compensated. The CPU also changes a shape of the extraction area so that a focal plane distortion is restrained, based on the motion detected by the motion detecting circuit.

12 Claims, 30 Drawing Sheets

(A)

(B)

(A) SENSOR OUTPUT IMAGE
(OPTICAL ZOOM=1.0)

H*V=3072*1728

(C) EIS/AF EVALUATION IMAGE
(RAWZOOM=0.63)

MD11-MD19

H*V=1536*864

FA (B) PRE-PROCESSING IMAGE
(RAWZOOM=0.63)

EX

H*V=1935*1088

(D) AE/AWB EVALUATION IMAGE
(RAWZOOM=0.63)

EWA

H*V=768*1728

(A) SENSOR OUTPUT IMAGE
(OPTICAL ZOOM=5.0)

H*V=3072*1728

(B) PRE-PROCESSING IMAGE
(RAWZOOM=0.7692)

EX

H*V=2363*1329

(C) EIS/AF EVALUATION IMAGE
(RAWZOOM=0.7692)

MD11-
MD19

H*V=1536*864

FA(H*V=
1258*697)

(D) AE/AWB EVALUATION IMAGE
(RAWZOOM=0.7692)

EWA(H*V=
590*1329)

H*V=
768*1728

(A) SENSOR OUTPUT IMAGE
(OPTICAL ZOOM=10.0)

H*V=3072*1728

(B) PRE-PROCESSING IMAGE
(RAWZOOM=1.0)

H*V=3072*1728

(C) EIS/AF EVALUATION IMAGE
(RAWZOOM=1.0)

MD11-MD19

H*V=1536*864

FA(H*V=968*540)

(D) AE/AWB EVALUATION IMAGE
(RAWZOOM=1.0)

EWA(H*V=484*1080)

H*V=768*1728

VIDEO CAMERA WHICH ADOPTS A FOCAL-PLANE ELECTRONIC SHUTTER SYSTEM

CROSS REFERENCE OF RELATED APPLICATION

The disclosures of Japanese Patent Application No. 2008-42281, which was filed on Feb. 23, 2008, and No. 2009-8455, which was filed on Jan. 19, 2009 are incorporated herein by reference.

BACKGROUND OF THE INVENTION

1. Field of the Invention

The present invention relates to a video camera. More specifically, the present invention relates to a video camera that performs a focal-plane-distortion correcting process on image data outputted from an image sensor adopting a focal-plane electronic shutter system.

2. Description of the Related Art

According to this type of a video camera (1), an image signal outputted from a CMOS image sensor is applied to a focal-plane-distortion correcting circuit. Upon noticing successive three frames, the focal-plane-distortion correcting circuit performs a linear interpolation process on the two frames different depending on a pixel position. Thereby, one frame of image signal on which a focal plane distortion is corrected is produced. Furthermore, according to another video camera (2), a scaling parameter corresponding to an electronic zoom magnification instructed by a zoom key is set to a RAW-data scaling circuit. The RAW-data scaling circuit performs a scaling process according to the scaling parameter on the image data outputted from an A/D converter. On an image display portion, a moving image based on RAW data outputted from the scaling processing circuit is displayed. However, in the video camera (1), a special circuit as described above is required in order to correct a focal plane distortion. Furthermore, in the video camera (2), when an angle of view of the image expressed by the RAW data on which the scaling process is performed is coincident with that of the image displayed on the image display portion, it is not possible to execute an image-quality correcting process affecting the angle of view, and thus, it is probable that the reproducing performance of the object scene image deteriorates.

SUMMARY OF THE INVENTION

A video camera according to the present invention, comprises: an imager for repeatedly outputting an object scene image produced on an imaging surface by an exposure operation of a focal-plane electronic shutter system in a raster scanning manner; an extractor for extracting a partial object scene image belonging to a designated area, out of the object scene image outputted from the imager; an outputter for outputting a moving image based on the partial object scene image extracted by the extractor; a detector for detecting motion of the imaging surface in a direction orthogonal to an optical axis; a position changer for changing a position of the designated area so that the motion detected by the detector is compensated; and a shape changer for changing a shape of the designated area so that a focal plane distortion is restrained based on the motion detected by the detector.

Preferably, the designated area is a rectangular area having a left side and a right side, and the shape changer includes an inclination amount changer for changing inclination amounts of the right side and the left side based on a horizontal component of the motion detected by the detector.

More preferably, the detector includes an allocator for allocating a plurality of blocks forming a line in a vertical direction to the object scene image outputted from the imager, and a motion vector detector for individually detecting motion vectors of a plurality of block images belonging to the plurality of block allocated by the allocator, and the inclination amount changer includes a function creator for creating a function for defining the inclination amounts based on horizontal components of the plurality of motion vectors created by the motion vector detector.

In an aspect of the present invention, the number of blocks allocated by the allocator is determined based on an imaging cycle of the imager and a vibration frequency of the imaging surface.

Preferably, the shape changer includes a first size changer for changing a vertical size of the designated area based on the vertical component of the motion detected by the detector, and the video camera further comprises a second size changer for changing a vertical size of the partial object scene image extracted by the extractor in association with a changing process of the first size changer.

More preferably, a change magnification of the second size changer is equivalent to an inverse number of a change magnification of the first size changer.

According to the present invention, an imaging control program product executed by a processor of a video camera provided with: an imager for repeatedly outputting an object scene image produced on an imaging surface by an exposure operation of a focal-plane electronic shutter system in a raster scanning manner; an extractor for extracting a partial object scene image belonging to a designated area, out of the object scene image outputted from the imager; an outputter for outputting a moving image based on the partial object scene image extracted by the extractor; and a detector for detecting motion of the imaging surface in a direction orthogonal to an optical axis, the imaging control program product, comprising: a position changing step of changing a position of the designated area so that the motion detected by the detector is compensated; and a shape changing step of changing a shape of the designated area so that a focal plane distortion is restrained based on the motion detected by the detector.

According to the present invention, an imaging control method executed by a video camera provided with: an imager for repeatedly outputting an object scene image produced on an imaging surface by an exposure operation of a focal-plane electronic shutter system in a raster scanning manner; an extractor for extracting a partial object scene image belonging to a designated area, out of the object scene image outputted from the imager; an outputter for outputting a moving image based on the partial object scene image extracted by the extractor; and a detector for detecting motion of the imaging surface in a direction orthogonal to an optical axis, the imaging control method, comprising: a position changing step of changing a position of the designated area so that the motion detected by the detector is compensated; and a shape changing step of changing a shape of the designated area so that a focal plane distortion is restrained based on the motion detected by the detector.

A video camera according to the present invention, comprises: an imager for repeatedly outputting an image representing an object scene; a reducer for reducing the image outputted from the imager; an extractor for extracting a partial reduced image belonging to an extraction area having a predetermined size, out of the reduced image created by the reducer; and a size changer for changing a size of the reduced image created by the reducer in a range exceeding the predetermined size upon receipt of a zoom operation.

Preferably, the video camera further comprises: a zoom lens arranged forwardly of the imager; and a magnification changer for changing a magnification of the zoom lens in the same direction as a change direction of the size changer in association with the changing process of the size changer.

Preferably, the video camera further comprises: a detector for detecting motion of an imaging surface in a direction orthogonal to an optical axis; and a position changer for changing a position of the extraction area so that the motion detected by the detector is compensated.

More preferably, the imager includes an exposer for exposing the imaging surface by a focal-plane electronic shutter system, and the video camera further comprises a shape changer for changing a shape of the extraction area so that a focal plane distortion is restrained based on the motion detected by the detector.

Further preferably, the extraction area is a rectangular area having a left side and a right side, and the shape changer changes inclination amounts of the right side and the left side based on a horizontal component of the motion detected by the detector.

In an aspect of the present invention, the video camera further comprises a limiter for limiting a change amount of the position changer by referencing the inclination amounts changed by the shape changer.

More preferably, the video camera further comprises a stopper for stopping the position changer when the motion detected by the detector is corresponding to a pan/tilt operation of the imaging surface.

Preferably, the image outputted from the imager is an image in which each pixel has any one of color information, out of a plurality of colors, and the video camera further comprises a convertor for converting the reduced image extracted by the extractor into an image in which each pixel has all the color information of the plurality of colors.

Preferably, the video camera further comprises an outputter for outputting a moving image based on the reduced image extracted by the extractor.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
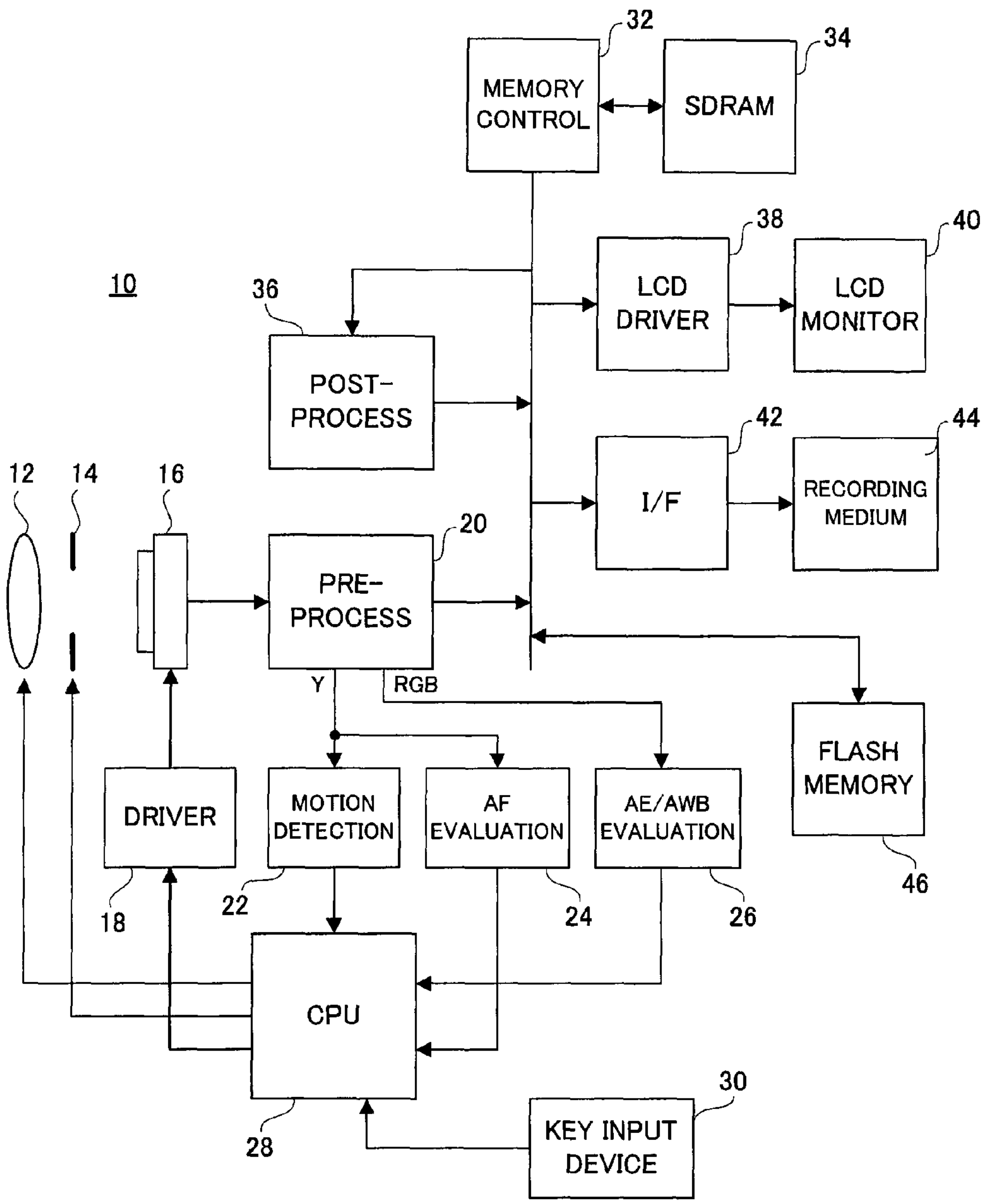
FIG. 1 is a block diagram showing a configuration of one embodiment of the present invention.

With reference to FIG. 1, a digital video camera 10 of this embodiment includes an optical lens 12 and an aperture unit 14. An optical image of an object scene is irradiated onto an imaging surface of a CMOS-type image sensor 16 through these members. The imaging surface is covered with a primary color filter (not shown) having a Bayer array. Therefore, in each pixel, electric charges having any one of color information, i.e., R (Red), G (Green), and B (Blue), are produced by photoelectric conversion.

Figure 2:
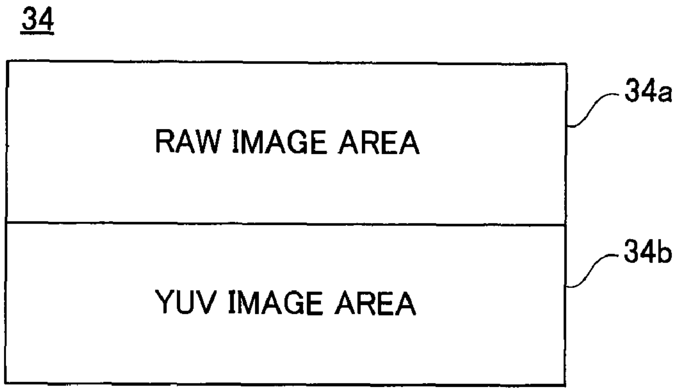
FIG. 2 is an illustrative view showing one example of a mapping state of an SDRAM applied to the embodiment in FIG. 1.

When a power supply is inputted, a CPU 28 starts a driver 18 in order to execute a through-image process. In response to a vertical synchronization signal Vsync generated at every 1/60 seconds, the driver 18 exposes the imaging surface utilizing a focal-plane electronic shutter system and reads out electric charges produced on the imaging surface in a raster scanning manner. From the image sensor 16, raw image data representing an object scene is outputted at a frame rate of 60 fps. A pre-processing circuit 20 performs processes, such as a digital clamp, a pixel defect correction, and a gain control, on the raw image data from the image sensor 16, and writes thus processed raw image data to a raw image area 34*a* (see FIG. 2) of an SDRAM 34 through a memory control circuit 32.

Figure 3:
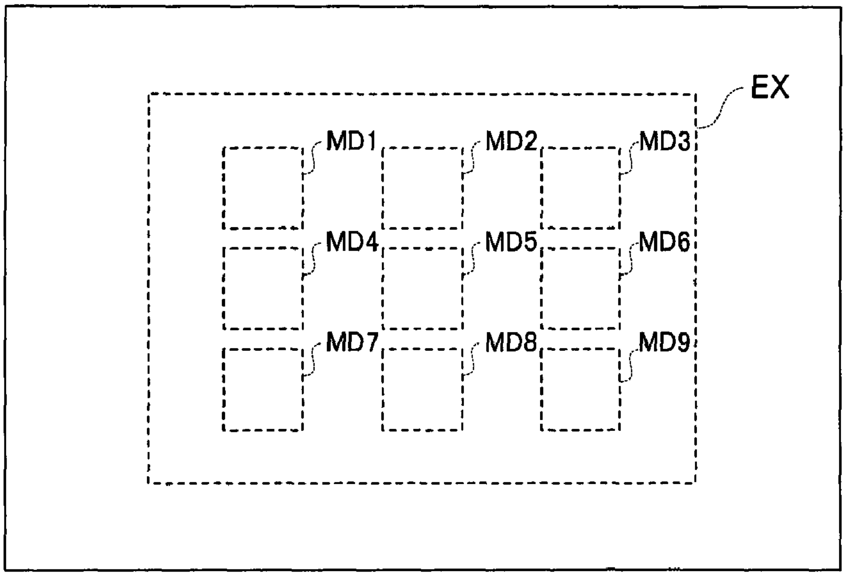
FIG. 3 is an illustrative view showing one example of an allocation state of an extraction area and a motion detection area in an imaging surface.

On the imaging surface, an extraction area EX is allocated in a manner shown in FIG. 3. A post-processing circuit 36 reads out a part of the raw image data belonging to the extraction area EX, out of the raw image data accommodated in the raw image area 24*a* through the memory control circuit 32 at every 1/60 seconds, and performs processes, such as a color separation, a white balance adjustment, a YUV conversion, and, a vertical zoom, on the read-out raw image data. As a result, display image data corresponding to a YUV format is created at every 1/60 seconds. The created display image data is written into a YUV image area 34*b* (see FIG. 2) of the SDRAM 34 through the memory control circuit 32.

The LCD driver 38 repeatedly reads out the display image data accommodated in the YUV image area 34*b* and drives an LCD monitor 40 based on the read-out YUV image data. As a result, a real-time moving image (through image) representing an object scene is displayed on a monitor screen.

The pre-processing circuit 20 executes a simple Y conversion process and a simple RGB conversion process in addition to the above-described processes. The raw image data is converted into Y data by the simple Y conversion process, and converted into RGB data (data in which each pixel has all color information of R, G and B) by the simple RGB conversion process. The Y data produced by the simple Y conversion process is applied to a motion detecting circuit 22 and an AF evaluation circuit 24, and the RGB data produced by the simple RGB conversion process is applied to an AE/AWB evaluation circuit 26.

With reference to FIG. 3, nine motion detection areas MD1 to MD9 are allocated on the imaging surface. The motion detection areas MD1 to MD3 form a line in a horizontal direction at an upper level of the imaging surface, the motion detection areas MD4 to MD6 form a line in a horizontal direction at a middle level of the imaging surface, and motion detection areas MD7 to MD9 form a line in a horizontal direction at a lower level of the imaging surface. A minimum number of motion detection areas to be allocated in a vertical direction is determined according to Equation 1.

$$MN = TM \times SF \times \alpha \quad \text{[Equation 1]}$$

MN: minimum number of motion detection areas to be allocated in a vertical direction TM: imaging cycle (generation cycle of a vertical synchronization signal Vsync)

SF: vibration frequency of the imaging surface

α: constant (=18)

According to Equation 1, when a multiplied value obtained by multiplying the imaging cycle and the vibration frequency of the imaging surface is multiplied by the constant α, the minimum number of motion detection areas to be allocated in a vertical direction is obtained. Herein, the vibration frequency of the imaging surface is equivalent to a camera shake frequency (=about 10 Hz) by an operator. Accordingly, when the imaging cycle is "1/60 seconds" as in this embodiment, the minimum number of motion detection areas to be allocated in a vertical direction becomes "3". Furthermore, when the imaging cycle is "1/30 seconds", the minimum number of motion detection areas to be allocated in a vertical direction becomes "6".

The motion detecting circuit 22 detects a partial motion vector representing motion of the object scene in each of the motion detection areas MD1 to MD9, based on the Y data applied from the pre-processing circuit 20 at every 1/60 seconds. The motion detecting circuit 22 further combines the partial motion vectors of the motion detection areas MD1 to MD3 to produce a resultant motion vector UVC at every 1/60 seconds, combines the partial motion vectors of the motion detection areas MD4 to MD6 to produce a resultant motion vector MVC at every 1/60 seconds, and combines the partial motion vectors of the motion detection areas MD7 to MD9 to produce a resultant motion vector LVC at every 1/60 seconds.

The resultant motion vector UVC represents motion of the object scene at the upper level of the imaging surface, the resultant motion vector MVC represents motion of the object scene at the middle level of the imaging surface, and the resultant motion vector LVC represents motion of the object scene at the lower level of the imaging surface.

Figure 4:
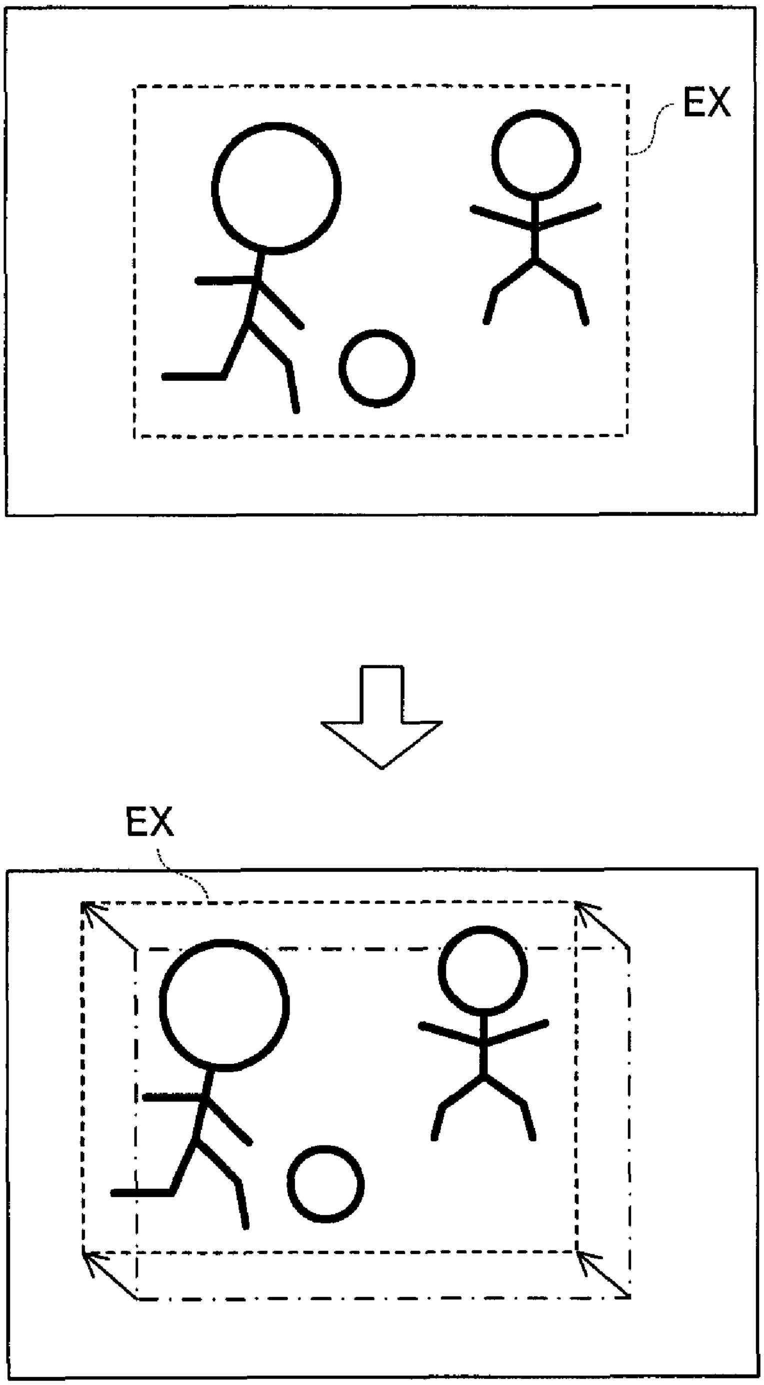
FIG. 4 is an illustrative view showing one example of an image stabilizing operation in the embodiment in FIG. 1.

The CPU 28 creates a total motion vector based on the resultant motion vectors UVC, MVC, and LVC outputted from the motion detecting circuit 22, determines whether the motion of the imaging surface in a direction orthogonal to an optical axis is caused due to which of the following: the camera shake or the pan/tilt operation, based on the total motion vector, and moves the extraction area EX along the total motion vector when the motion of the imaging surface is caused due to the camera shake. A position of the extraction area EX is changed so that the motion of the imaging surface caused due to the camera shake is compensated (offset). When a camera shake occurs on the imaging surface, the extraction area EX moves on the imaging surface in a manner shown in FIG. 4.

The AF evaluation circuit 26 creates an AF evaluation value at every 1/60 seconds based on the Y data applied from the pre-processing circuit 20. The CPU 28 executes a so-called hill-climbing AF process based on the created AF evaluation value, and places the optical lens 12 at a focal point.

The AE/AWB evaluation circuit 24 creates an AE/AWB evaluation value at every 1/60 seconds based on the RGB data applied from the pre-processing circuit 20. The CPU 28 calculates an EV value capable of obtaining a proper exposure amount and a white balance adjustment gain capable of obtaining a proper white balance, based on the created AE/AWB evaluation value. The CPU 28 further sets an aperture amount and an exposure time that define the calculated EV value to the aperture unit 14 and the driver 18, and sets the calculated white balance adjustment gain to the post-processing circuit 36. As a result, the brightness and the white balance of the moving image outputted from the LCD monitor 40 are adjusted moderately.

When a recording start operation is performed by a key input device 30, an I/F 42 is started by the CPU 28. The I/F 42 reads out the image data accommodated in the YUV image area 34*b* at every 1/60 seconds, and writes the read-out image data in a moving image file within a recording medium 44 in a compressed state. The I/F 42 is stopped by the CPU 28 when a recording end operation is performed on the key input device 30. As a result, the recording process of the image data is ended.

Figure 5:
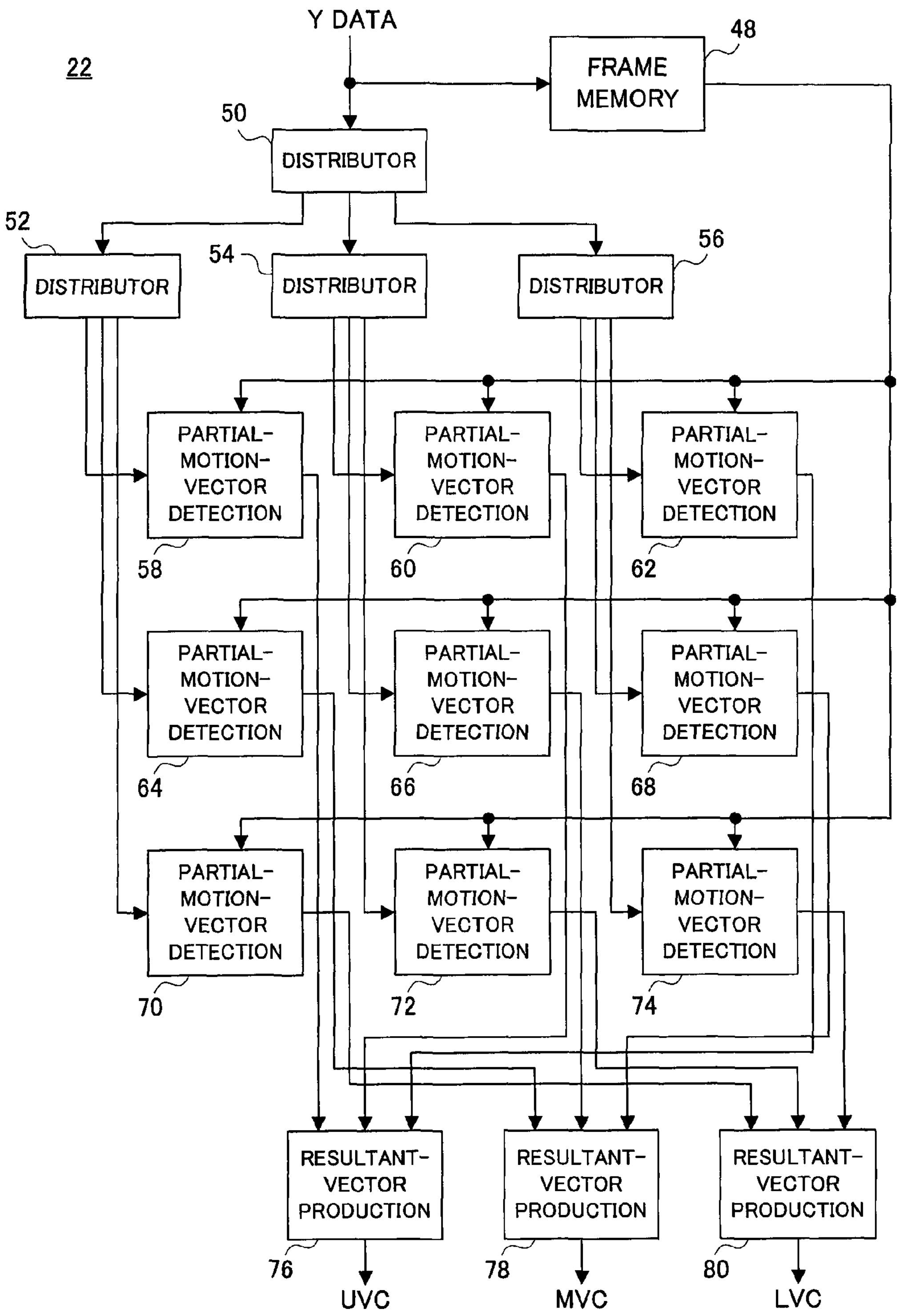
FIG. 5 is a block diagram showing one example of a configuration of a motion detecting circuit applied to the embodiment in FIG. 1.

The motion detecting circuit 22 is configured as shown in FIG. 5. The Y data is applied to a frame memory 48 and a distributor 50. The frame memory 48 is formed by two banks each having a capacity equivalent to one frame, and the applied Y data is alternately written into the two banks.

The distributor 50 applies the Y data belonging to the motion detection areas MD1, MD4, and MD7 to a distributor 52, applies the Y data belonging to the motion detection areas MD2, MD5, and MD8 to a distributor 54, and applies the Y data belonging to the motion detection areas MD3, MD6, and MD9 to a distributor 56.

The distributor 52 applies the Y data belonging to the motion detection area MD1 to a partial-motion-vector detecting circuit 58, applies the Y data belonging to the motion detection area MD4 to a partial-motion-vector detecting circuit 64, and applies the Y data belonging to the motion detection area MD7 to a partial-motion-vector detecting circuit 70. The distributor 54 applies the Y data belonging to the motion detection area MD2 to a partial-motion-vector detecting circuit 60, applies the Y data belonging to the motion detection area MD5 to a partial-motion-vector detecting circuit 66, and applies the Y data belonging to the motion detection area MD8 to a partial-motion-vector detecting circuit 72. The distributor 56 applies the Y data belonging to the motion detection area MD3 to a partial-motion-vector detecting circuit 62, applies the Y data belonging to the motion detection area MD6 to a partial-motion-vector detecting circuit 68, and applies the Y data belonging to the motion detection area MD9 to a partial-motion-vector detecting circuit 74.

Each of the partial-motion-vector detecting circuits 58 to 74 compares the Y data applied from the distributor 52, 54 or 56 with the Y data of the previous frame accommodated in the frame memory 48 so as to detect the partial motion vector representing the motion of the object scene in the motion detection area to be noticed. As a result, nine partial motion vectors respectively corresponding to the motion detection areas MD1 to MD9 are obtained.

A resultant-motion-vector producing circuit 76 combines the three partial motion vectors respectively detected by the partial-motion-vector detecting circuits 58, 60, and 62 to produce a resultant motion vector UVC representing the motion of the object scene at an upper level of the imaging surface. A resultant-motion-vector producing circuit 78 combines the three partial motion vectors respectively detected by the partial-motion-vector detecting circuits 64, 66, and 68 to produce a resultant motion vector MVC representing the motion of the object scene at a middle level of the imaging surface. A resultant-motion-vector producing circuit 80 combines the three partial motion vectors respectively detected by the partial-motion-vector detecting circuits 70, 72 and, 74 to produce a resultant motion vector LVC representing the motion of the object scene at a lower level of the imaging surface.

Figure 6:
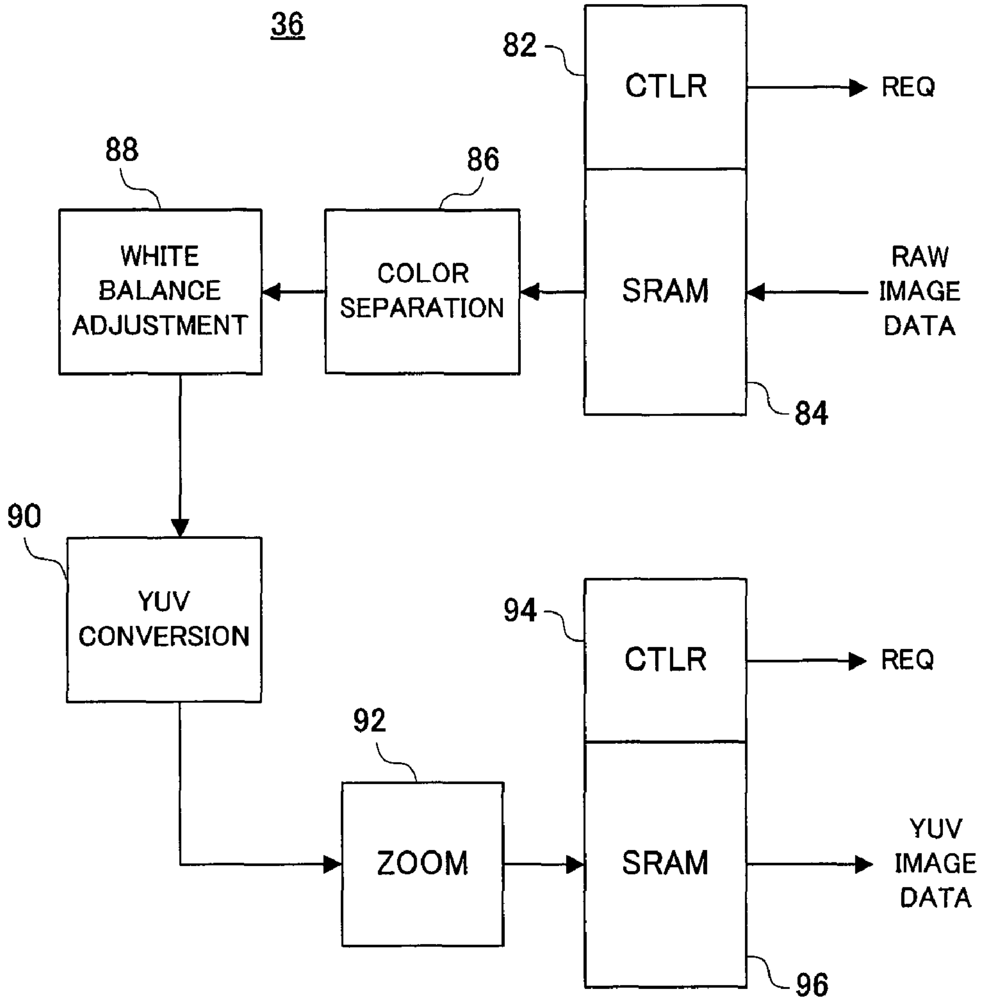
FIG. 6 is a block diagram showing one example of a configuration of a post-processing circuit applied to the embodiment in FIG. 1.

The post-processing circuit 36 is configured as shown in FIG. 6. A controller 82 repeatedly issues a reading-out request toward the memory control circuit 32 in order to read out the Y data belonging to the extraction area EX from the raw image area 34*a* of the SDRAM 34. The raw image data read out in response thereto undergoes an SRAM 84, and then, is applied to a color separation circuit 86. The color separation circuit 86 produces RGB data in which each pixel has all color information of R, G and B, based on the applied raw image data.

The produced RGB data is subjected to a white balance adjustment process by a white balance adjustment circuit 88, and then converted into image data in a YUV format by a YUV conversion circuit 90. The converted image data undergoes a vertical zoom process (described later in detail) by a zoom circuit 92, and then, is written into an SRAM 96. A controller 94 outputs the image data accumulated in the SRAM 96 to the memory control circuit 32, together with the writing request. The outputted image data is written into the YUV image area 34*b* of the SDRAM 34 by the memory control circuit 32.

Figure 7:
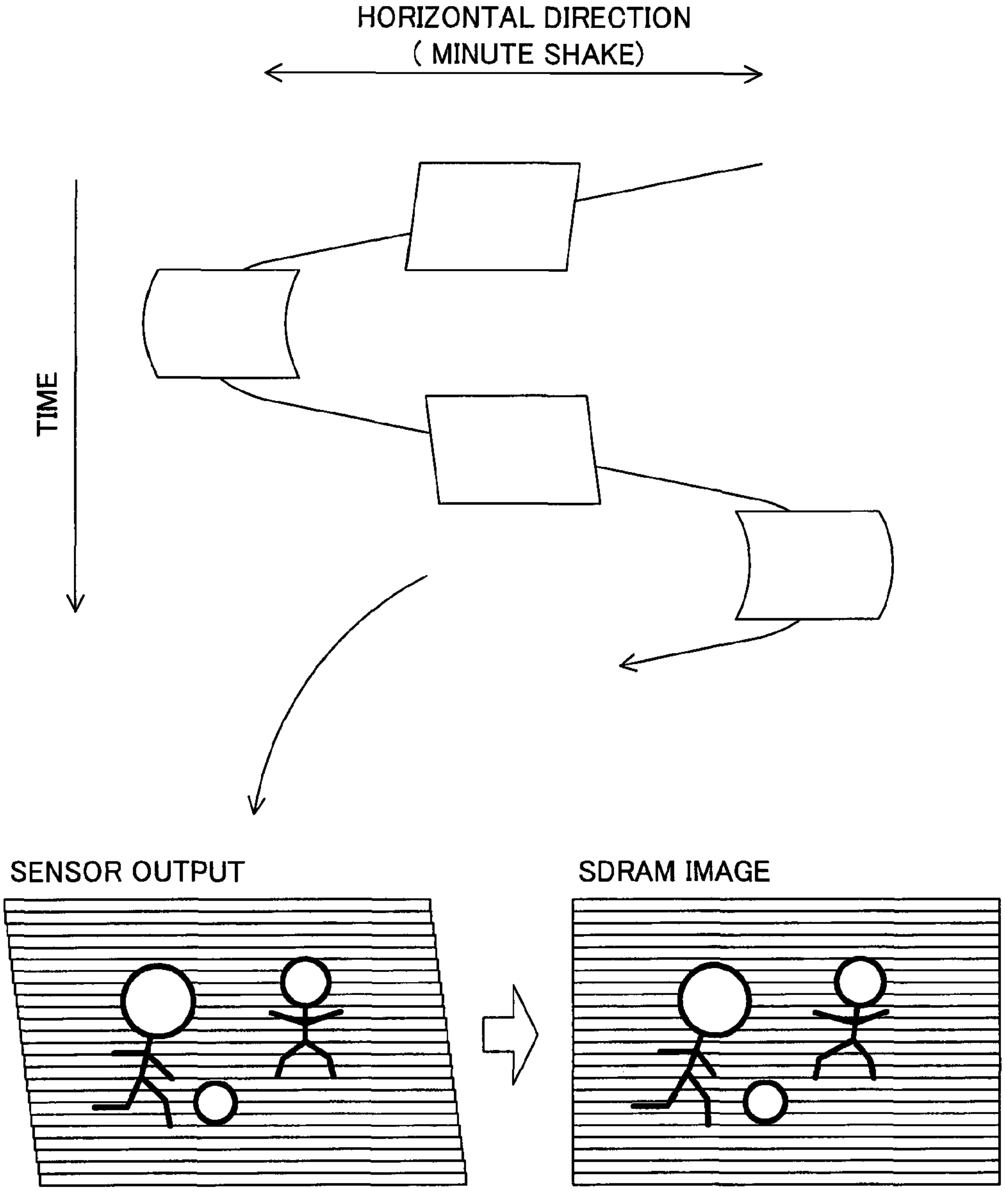
FIG. 7 is an illustrative view showing one example of an imaging operation in the embodiment in FIG. 1.
Figure 10:
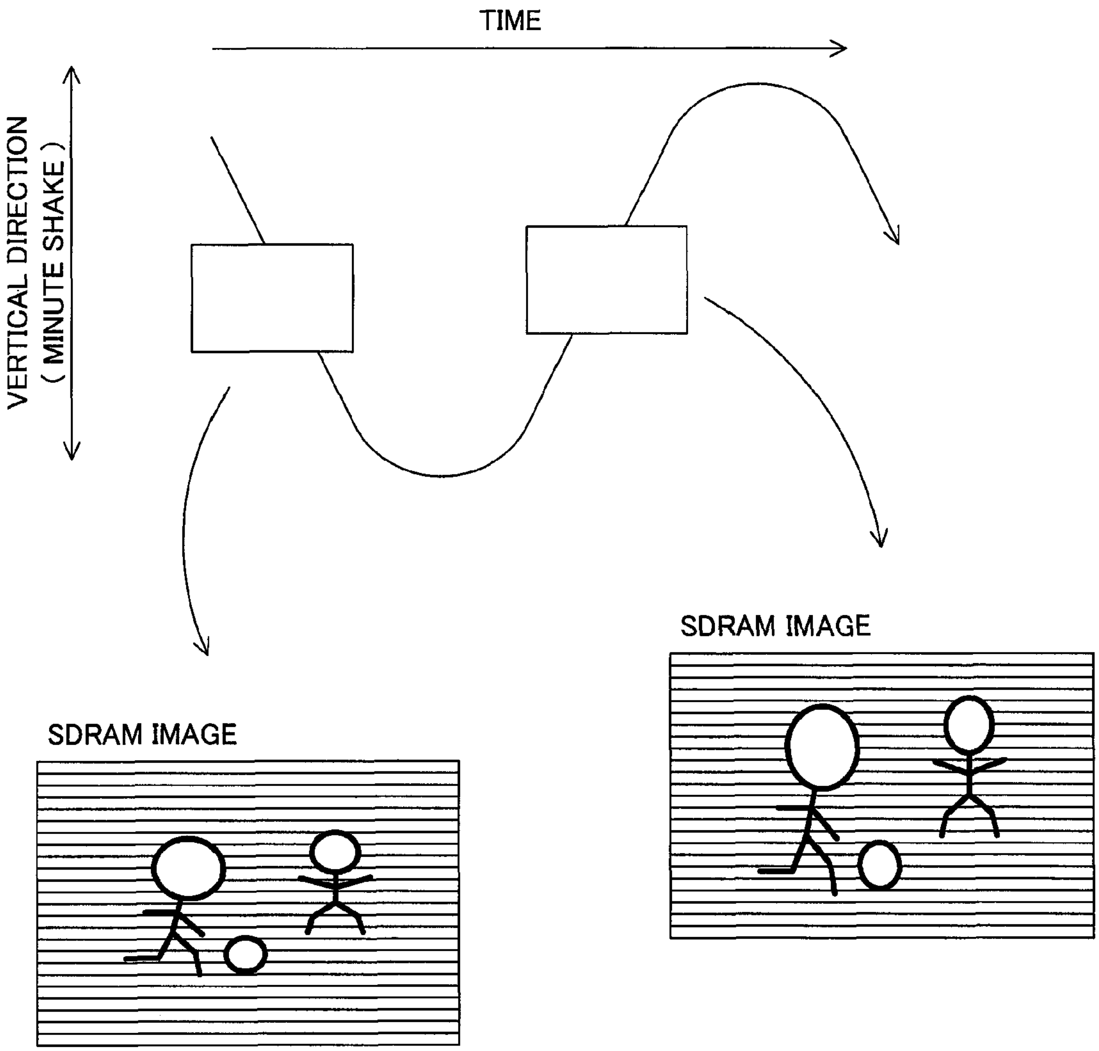
FIG. 10 is an illustrative view showing another example of the imaging operation in the embodiment in FIG. 1.

As described above, the image sensor 16 exposes the imaging surface utilizing the focal-plane electronic shutter system, and therefore, the exposure timing is different depending on each horizontal pixel column. Then, in the raw image data accommodated in the SDRAM 34, a focal plane distortion in a horizontal direction is generated due to a horizontal movement of the imaging surface (see FIG. 7), and a focal plane distortion in a vertical direction is generated due to a vertical movement of the imaging surface (see FIG. 10). Therefore, in this embodiment, a shape of the extraction area EX is changed based on the output from the motion detecting circuit 22 so as to restrain the focus plane distortion.

When the focal plane distortion in a horizontal direction is generated, inclination amounts on a right side and a left side of a rectangle representing the extraction area EX are changed in a manner shown in FIG. 8(A) to FIG. 8(D). That is, when the imaging surface moves in a right direction, the exposure timing of the imaging surface changes in a manner shown in a left column in FIG. 8(A), and therefore, the right side and the left side of the extraction area EX are inclined in a manner shown in aright column in FIG. 8(A). Furthermore, when the imaging surface moves in a left direction, the exposure timing of the imaging surface changes in a manner shown in a left column in FIG. 8(B), and therefore, the right side and the left side of the extraction area EX are inclined in a manner shown in a right column of FIG. 8(B).

Figure 8:
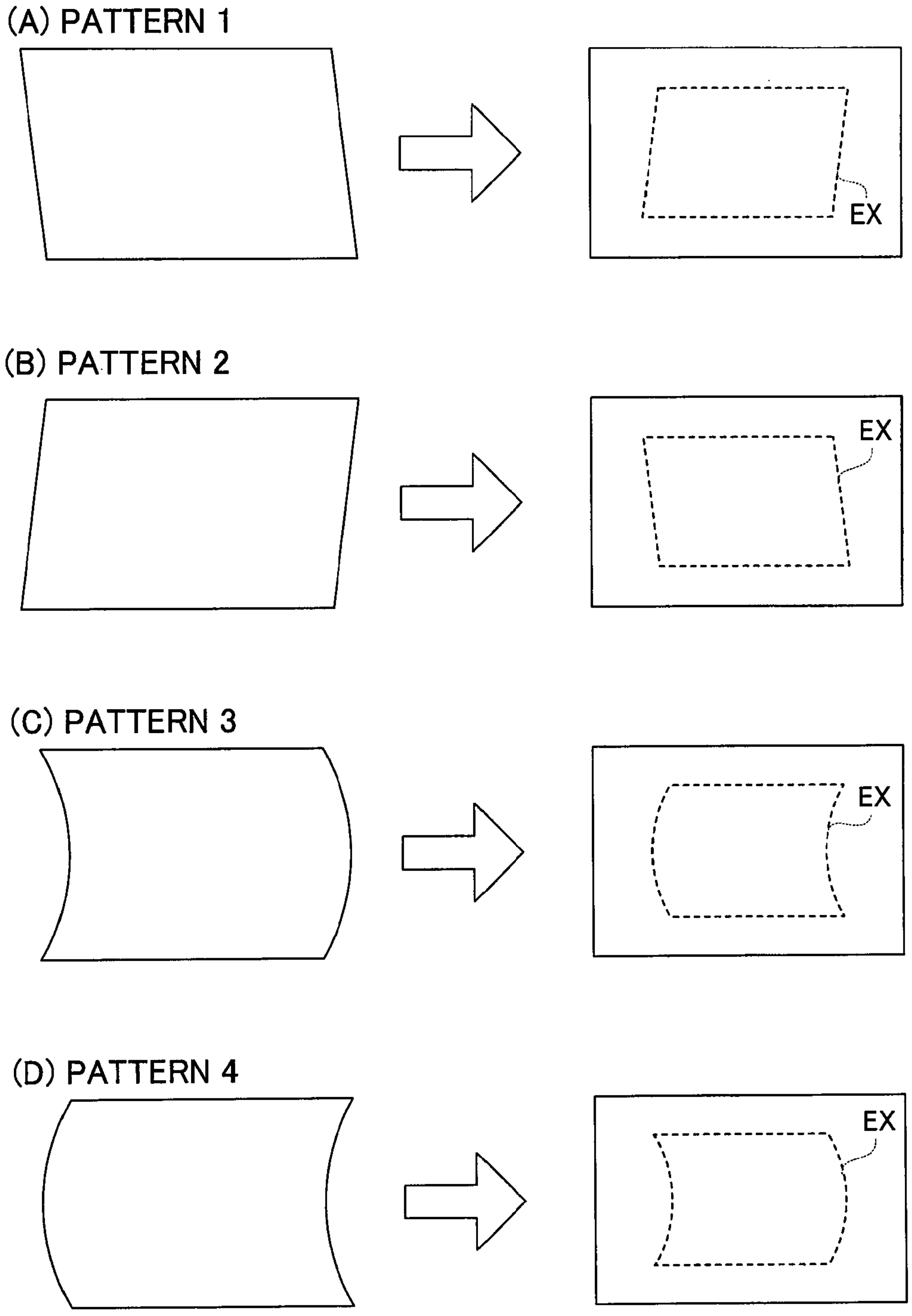
FIG. 8(A) is an illustrative view showing one example of an image stabilizing process of an extraction area.
FIG. 8(B) is an illustrative view showing another example of the shape changing process of an extraction area.
FIG. 8(C) is an illustrative view showing still another example of the shape changing process of an extraction area.
FIG. 8(D) is an illustrative view showing yet still another example of the shape changing process of an extraction area.

In addition, when the moving direction of the imaging surface is inverted from right to left, the exposure timing of the imaging surface changes in a manner shown in a left column of FIG. 8(C), and therefore, the right side and the left side of the extraction area EX are inclined in a manner shown in aright column of FIG. 8(C). Furthermore, when the moving direction of the imaging surface is inverted from left to right, the exposure timing of the imaging surface changes in a manner shown in a left column of FIG. 8(D), and therefore, the right side and the left side of the extraction area EX are inclined in a manner shown in a right column of FIG. 8(D).

Figure 9:
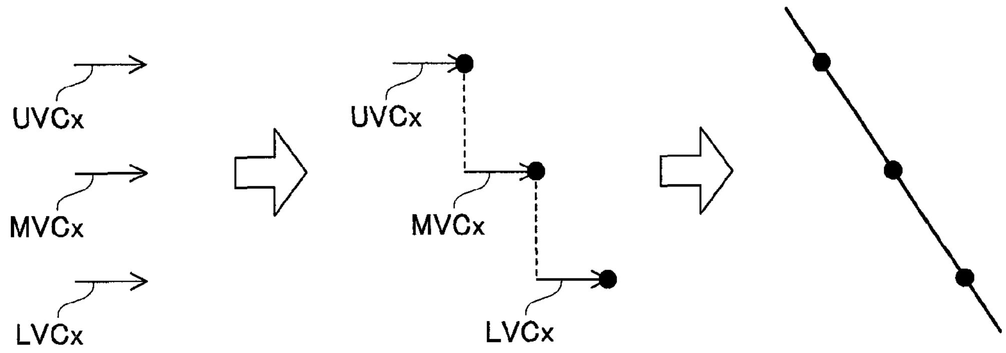
FIG. 9(A) is an illustrative view showing one example of an operation for determining inclination amounts of a left side and a right side of an extraction area.
FIG. 9(B) is an illustrative view showing another example of an operation for determining inclination amounts of a left side and a right side of an extraction area.
Figure 9:
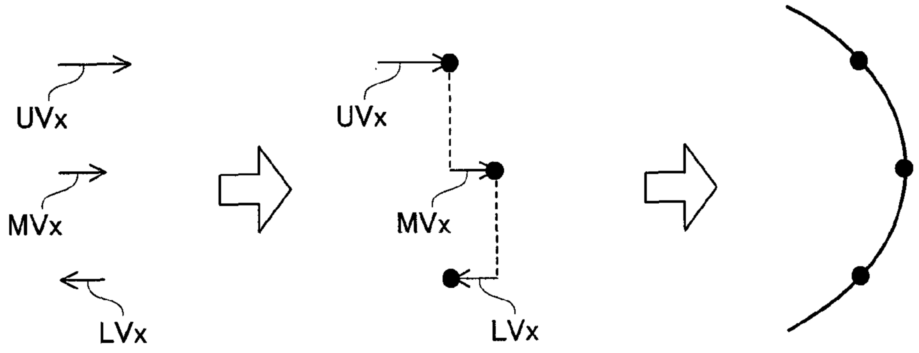

The inclination amount is determined in a manner shown in FIG. 9(A) or FIG. 9(B) based on the resultant vectors UVC, MVC, and LVC outputted from the motion detecting circuit 22. Firstly, horizontal components of the resultant motion vectors UVC, MVC, and LVC are specified as "UVCx", "MVCx" and "LVCx", respectively. Secondly, a Y coordinate of the horizontal component UVCx is determined corresponding to vertical positions of the motion detection areas MD1 to MD3, a Y coordinate of the horizontal component MVCx is determined corresponding to vertical positions of the motion detection areas MD4 to MD6, and a Y coordinate of the horizontal component LVCx is determined corresponding to vertical positions of the motion detection areas MD7 to MD9.

Moreover, X coordinates at distal ends of the horizontal components UVCx, MVCx, and LVCx are determined such that an X coordinate at a proximal end of the horizontal component MVCx is coincident with that at a distal end of the horizontal component UVCx, and an X coordinate at a proximal end of the horizontal component LVCx is coincident with that at a distal end of the horizontal component MVCx. Thereafter, an approximate function representing a straight line or a curve linking the determined three XY coordinates is calculated.

Accordingly, in a case that the horizontal components UVCx, MVCx, and LVCx have a magnitude shown in a left column in FIG. 9(A), three XY coordinates are determined in a manner shown in a center column in FIG. 9(A), and an approximate function having an inclination shown in a right column in FIG. 9(A) is calculated. Furthermore, when the horizontal components UVCx, MVCx, and LVCx have a magnitude shown in a left column in FIG. 9(B), three XY coordinates are determined in a manner shown in a center column in FIG. 9(B), and an approximate function having an inclination shown in a right column in FIG. 9(B) is calculated.

Figure 11:
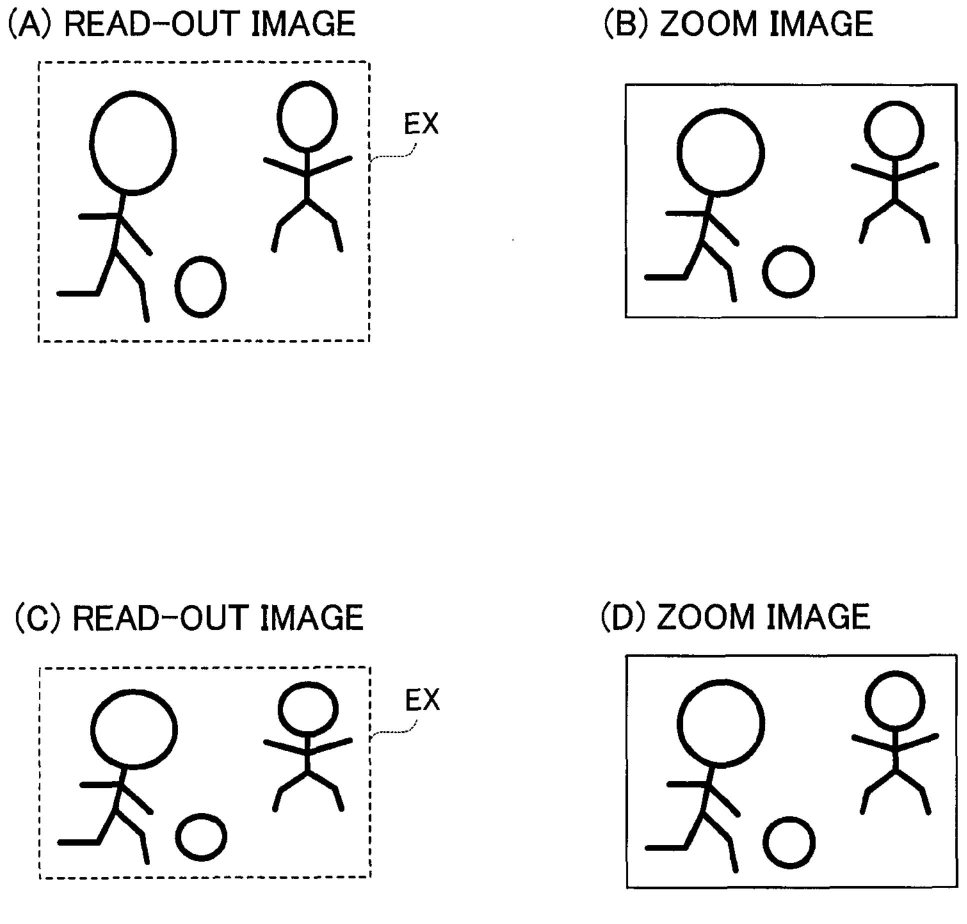
FIG. 11(A) is an illustrative view showing one example of an object scene image inputted to a post-processing circuit.
FIG. 11(B) is an illustrative view showing one example of an object scene image outputted from the post-processing circuit.
FIG. 11(C) is an illustrative view showing another example of an object scene image inputted to the post-processing circuit.
FIG. 11(D) is an illustrative view showing another example of an object scene image outputted from the post-processing circuit.

When a focal plane distortion in a vertical direction is generated, a vertical size of the extraction area EX is enlarged/reduced in a manner shown in FIG. 11(A) or FIG. 11(C), and a vertical size of the image data corresponding to the extraction area EX is restored to the original size by the zoom circuit 92 arranged in the post-processing circuit 36 in a manner shown in FIG. 11(B) or FIG. 11(D). A change magnification of the vertical size of the extraction area EX is calculated according to Equation 2, and the zoom magnification of the zoom circuit 92 is calculated according to Equation 3.

$$ZM1=1+VM/VPX \quad \text{[Equation 2]}$$

ZM1: a change magnification of the vertical size of the extraction area EX

VM: the number of pixels equivalent to the vertical component of the total motion vector VPX: the number of vertical pixels of the imaging surface $$ZM2=1/ZM1 \quad \text{[Equation 3]}$$

ZM2: zoom magnification

According to Equation 2, a numerical value obtained by adding "1" to a ratio of the number of pixels equivalent to the vertical component of the total motion vector to the number of vertical pixels of the imaging surface is equivalent to a change magnification of the vertical size of the extraction area EX. According to Equation 3, the zoom magnification of the zoom circuit 92 is equivalent to an inverse number of the change magnification of the vertical size of the extraction area EX.

Figure 12:
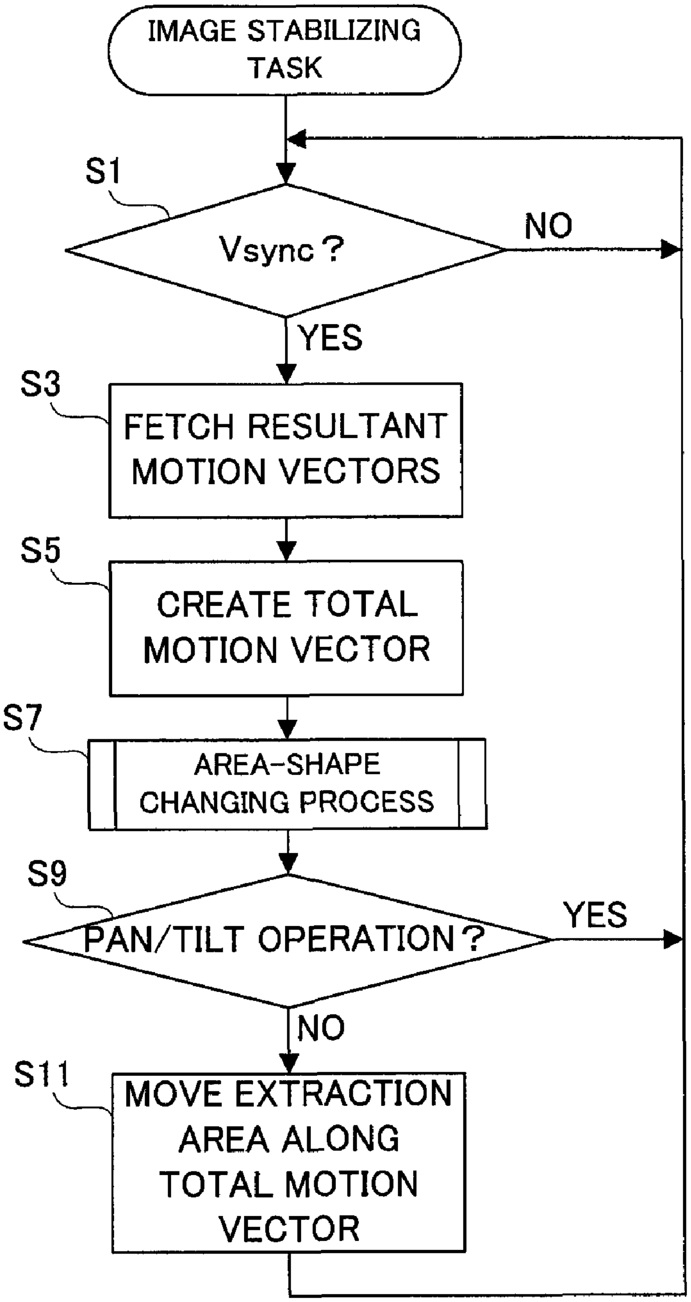
FIG. 12 is a flowchart showing a part of an operation of a CPU applied to the embodiment in FIG. 1.
Figure 13:
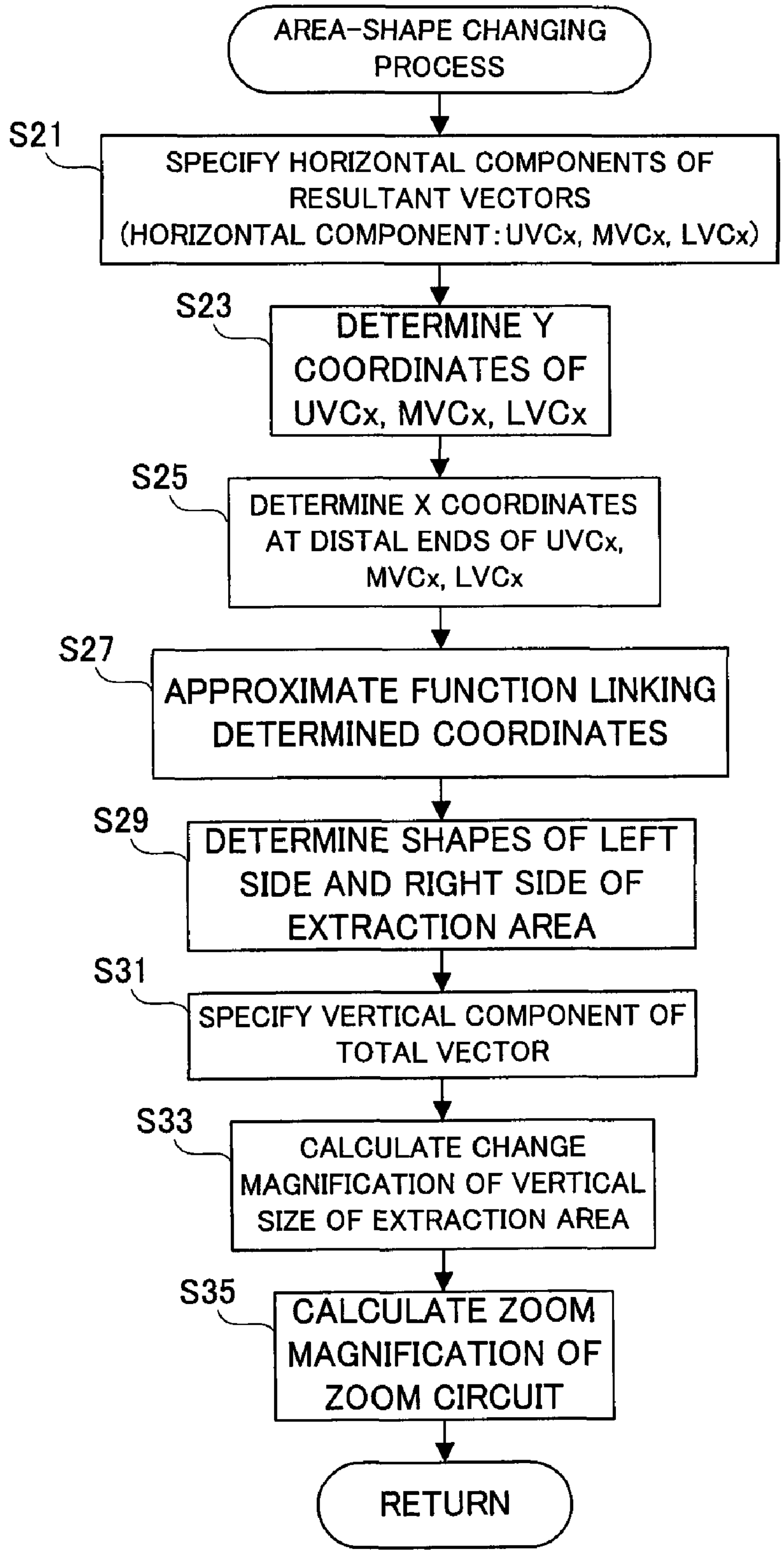
FIG. 13 is a flowchart showing another portion of the operation of the CPU applied to the embodiment in FIG. 1.

The CPU 28 processes a plurality of tasks, including an image stabilizing task shown in FIG. 12 to FIG. 13, in parallel. It is noted that control programs corresponding to these tasks are stored in a flash memory 46.

With reference to FIG. 12, it is determined whether or not a vertical synchronization signal Vsync is generated in a step S1, and if YES, the resultant motion vectors UVC, MVC, and LVC are fetched from the motion detecting circuit 22 in a step S3. In a step S5, the total motion vector is created based on the fetched resultant motion vectors UVC, MVC, and LVC. In a step S7, an area-shape changing process is executed, and in a succeeding step S9, it is determined whether or not the motion of the imaging surface at the current time point is caused due to a pan/tilt operation based on the total motion vector. If YES in this step, the process directly returns to the step S1, and if NO, the extraction area EX is moved along the total motion vector in a step S11, and then, the process returns to the step S1.

The area-shape changing process in the step S7 is executed according to a subroutine shown in FIG. 13. Firstly, in a step S21, the horizontal components of the resultant motion vectors UVC, MVC, and LVC are specified as "UVCx", "MVCx" and "LVCx". In a step S23, a Y coordinate of the horizontal component UVCx is determined corresponding to vertical positions of the motion detection areas MD1 to MD3, and a Y coordinate of the horizontal component MVCx is determined corresponding to vertical positions of the motion detection areas MD4 to MD6, and a Y coordinate of the horizontal component LVCx is determined corresponding to vertical positions of the motion detection areas MD7 to MD9.

In a step S25, the X coordinates at the distal end of the horizontal components UVCx, MVCx and LVCx are determined such that the X coordinate at the proximal end of the horizontal component MVCx is coincident with the X coordinate at the distal end of the horizontal component UVCx, and the X coordinate at the proximal end of the horizontal component LVCx is coincident with the X coordinate at the distal end of the horizontal component MVCx. In a step S27, an approximate function representing a straight line or a curve linking the determined three XY coordinates is calculated, and in a step S29, inclination amounts of a right side and a left side of the extraction area EX are determined according to the calculated approximate function.

In a step S31, the vertical component of the total motion vector is specified. In a step S33, a change magnification of a vertical size of the extraction area EX is calculated according to the Equation 2, and in a step S35, a zoom magnification of the zoom circuit 92 is calculated according to the Equation 3. Upon completion of the process in the step S35, the process is restored to a routine at a hierarchical upper level.

As understood from the above description, the image sensor 16 repeatedly outputs in a raster scanning manner an object scene image produced on the imaging surface by the exposure operation of the focal-plane electronic shutter system. The post-processing circuit 36 extracts a partial object scene image belonging to the extraction area EX, out of the object scene image outputted from the image sensor 16. A moving image based on the extracted partial object scene image is displayed on the LCD monitor 40 by the LCD driver 38. The motion detecting circuit 22 detects motion of the imaging surface in a direction orthogonal to the optical axis. The position of the extraction area EX is changed by the CPU 28 such that the motion detected by the motion detecting circuit 22 is compensated (S11). The CPU 28 further changes the shape of the extraction area EX based on the motion detected by the motion detecting circuit 22 so that a focal plane distortion is restrained (S7).

Thus, the position of the extraction area EX is changed so that the motion of the imaging surface in a direction orthogonal to the optical axis is compensated, and the shape of the extraction area EX is changed so that the focal plane distortion is restrained. As a result, the shake of the imaging surface and the focal plane distortion are corrected unitarily, and therefore, it is possible to ameliorate the quality of the moving image with a simple circuit configuration.

It is noted that in this embodiment, the extraction area EX is moved along the total motion vector. However, in addition thereto, the evaluation area referenced by the AE/AWB evaluation circuit 26 may be moved as if to follow the extraction area EX.

Figure 14:
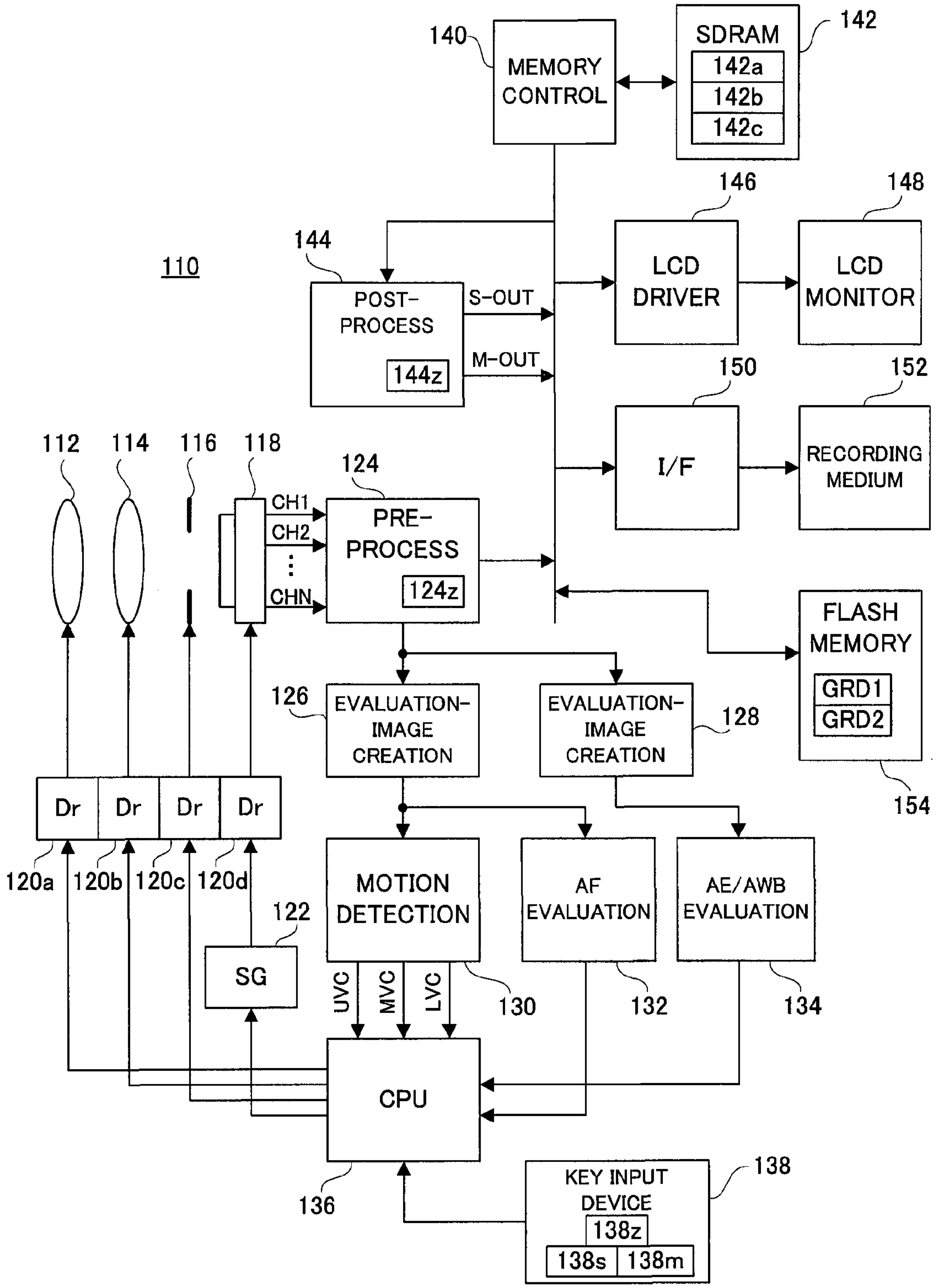
FIG. 14 is a block diagram showing a configuration of another embodiment of the present invention.

With reference to FIG. 14, a digital video camera 110 according to this embodiment includes a zoom lens 112, a focus lens 114, and an aperture unit 116 respectively driven by drivers 120*a*, 120*b*, and 120*c*. An optical image of an object scene is irradiated onto an imaging surface of a CMOS-type image sensor 118 through these members. The imaging surface has an effective pixel area equivalent to horizontal 3072 pixels×vertical 1728 pixels, and is also covered with a primary color filter (not shown) having a Bayer array Electric charges produced in each pixel have any one of color information, i.e., R (Red), G (Green), and B (Blue).

Figure 15:
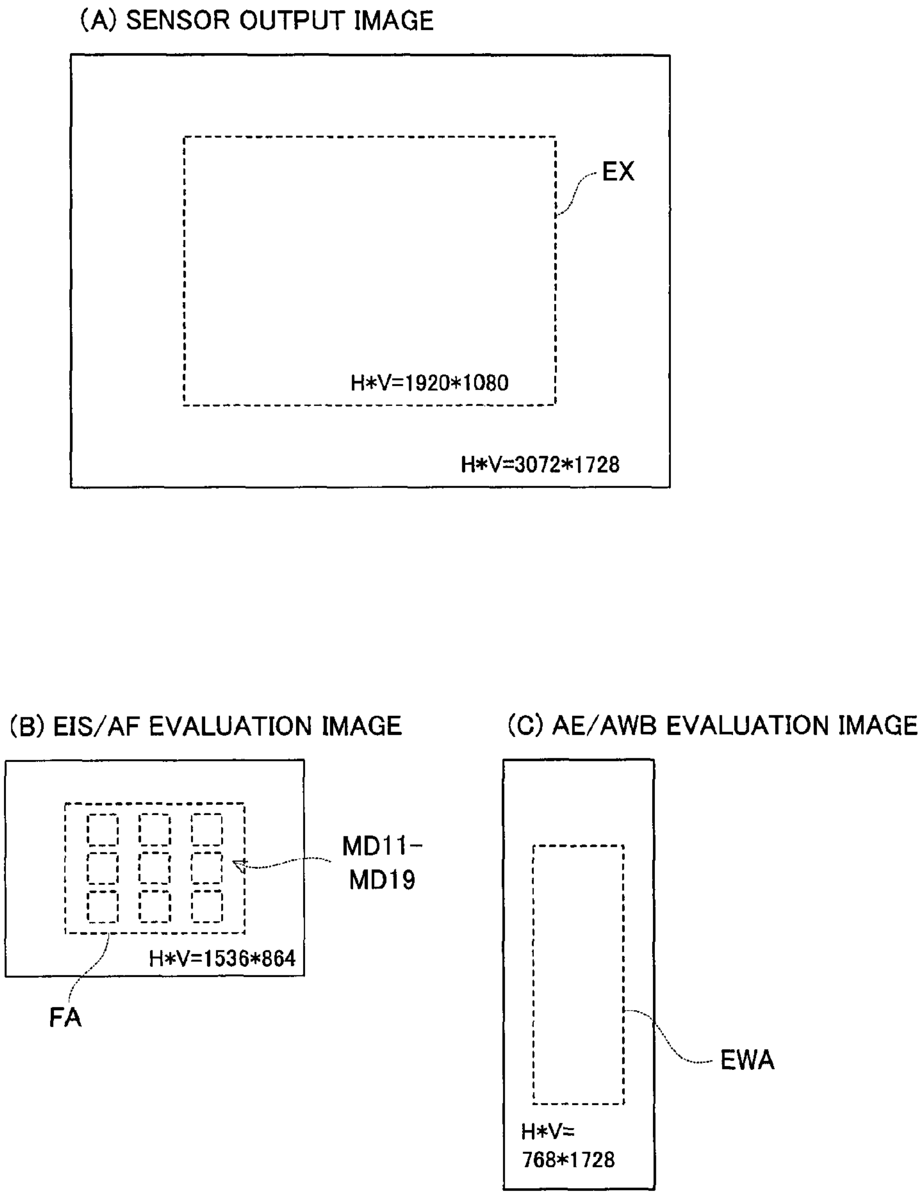
FIG. 15(A) is an illustrative view showing one example of a resolution of an image outputted from an image sensor.
FIG. 15(B) is an illustrative view showing one example of a resolution of an EIS/AF evaluation image.
FIG. 15(C) is an illustrative view showing one example of a resolution of an AE/AWB evaluation image.

When a power source is inputted, a CPU 136 applies a corresponding command to the driver 120*d* in order to execute a through-image process. From an SG (Signal Generator) 122, a vertical synchronization signal Vsync is generated at every 1/30 seconds, for example. The driver 120*d* exposes the imaging surface according to a focal-plane electronic shutter system in response to the vertical synchronization signal Vsync generated from the SG 122, and reads out the electric charges produced thereby from the imaging surface. The image sensor 118 has N (N: integer of equal to or more than 2, "4", for example) of channels CH1 to CHN, and raw image data based on the read-out electric charges are outputted dispersively (in parallel) from the channels CH1 to CHN. The outputted raw image data has a resolution of horizontal 3072 pixels×vertical 1728 pixels, as shown in FIG. 15(A).

The pre-processing circuit 124 respectively performs pre-processes of parallel N systems on the raw image data of N channels outputted from the image sensor 118. The pre-processes of each system are configured by a noise removal, a reduction zoom, and an edge adjustment, and the raw image data that undergoes such the pre-processes is written in a raw image area 142*a* of an SDRAM 142 through a memory control circuit 140.

It is noted that the reduction zoom in the pre-processing circuit 124 is executed by a zoom circuit 124*z*. Below, the reduction zoom executed by the zoom circuit 124*z* is defined as "RAW zoom".

The raw image data (resolution: horizontal 3072 pixels× vertical 1728 pixels) on which the noise removal is performed by the pre-processing circuit 122 is applied to evaluation-image creating circuits 126 and 128. The evaluation-image creating circuit 126 performs an adding process of vertical two pixels and an adding process of horizontal two pixels on the applied raw image data so as to create EIS/AF evaluation image data. On the other hand, the evaluation-image creating circuit 128 performs an adding process of horizontal four pixels on the applied raw image data so as to create AE/AWB evaluation image data.

The EIS/AF evaluation image data has a resolution of horizontal 1536 pixels×vertical 864 pixels, as shown in FIG. 15(B). The AE/AWB evaluation image data has a resolution of horizontal 768 pixels×vertical 1728 pixels, as shown in FIG. 15(C). The EIS/AF evaluation image data is applied to the motion detecting circuit 130 and the AF evaluation circuit 132, and the AE/AWB evaluation image data is applied to the AE/AWB evaluation circuit 134.

With reference to FIG. 15(A) and FIG. 15(B), one extraction area EX and nine motion detection areas MD11 to MD19 are allocated to the imaging surface. The extraction area EX is a rectangular area having a size of horizontal 1920 pixels× vertical 1080 pixels. Furthermore, the motion detection areas MD11 to MD13 form a line in a horizontal direction at an upper level of the imaging surface, the motion detection areas MD14 to MD16 form a line in a horizontal direction at a middle level of the imaging surface, and the motion detection areas MD17 to MD19 form a line in a horizontal direction at a lower level of the imaging surface.

The motion detecting circuit 130 detects a partial motion vector representing motion of an object scene in each of the motion detection areas MD11 to MD19, based on the EIS/AF evaluation image data. The motion detecting circuit 130 also combines partial motion vectors in the motion detection areas MD11 to MD13 so as to produce a resultant motion vector UVC, combines partial motion vectors in the motion detection areas MD14 to MD16 to produce a resultant motion vector MVC, and combines partial motion vectors in the motion detection areas MD17 to MD19 so as to produce a resultant motion vector LVC.

Either a detection process for the partial motion vector or a creating process for the resultant motion vector is executed at each generation of the vertical synchronization signal Vsync. Furthermore, the resultant motion vector UVC represents motion of an object scene at the upper level of the imaging surface, the resultant motion vector MVC represents motion of an object scene at the middle level of the imaging surface, and the resultant motion vector LVC represents motion of an object scene at the lower level of the imaging surface.

The CPU 136 creates a total motion vector based on the resultant motion vectors UVC, MVC, and LVC outputted from the motion detecting circuit 130, determines whether the motion of the imaging surface in a direction orthogonal to an optical axis is caused due to which of the following: the camera shake or the pan/tilt operation, based on the total motion vector, and moves the extraction area EX along the total motion vector when the motion of the imaging surface is caused due to the camera shake. A position of the extraction area EX is changed so that the motion of the imaging surface is caused due to the camera shake is compensated (offset).

A post-processing circuit 144 reads out the partial raw image data belonging to the extraction area EX, out of the raw image data accommodated in the raw image area 142*a*, through the memory control circuit 140, and performs post processes, such as a color separation, a white balance adjustment, a YUV conversion, and an enlargement zoom, on the read-out partial raw image data. The partial raw image data is read out from the raw image area 142*a* in response to the vertical synchronization signal Vsync, and the post-process is also executed in response to the vertical synchronization signal Vsync. The image data of a YUV format thus produced is outputted from a moving-image output terminal M_OUT, and written into a moving image area 142*b* of the SDRAM 142 through the memory control circuit 140.

It is noted that each of a plurality of pixels forming the image data on which the color separation process is performed has all color information of R, Q and B. The format of such image data is converted to a YUV format by the YUV conversion, and the enlargement zoom is further performed thereon. In addition, the enlargement zoom in the post-processing circuit 144 is executed by the zoom circuit 144*z*. Below, the enlargement zoom executed by the post-processing circuit 144 is defined as "YUV zoom".

The LCD driver 146 repeatedly reads out the image data accommodated in the moving image area 142*b*, and drives an LCD monitor 148 based on the read-out image data. As a result, a real-time moving image (through image) representing an object scene is displayed on a monitor screen.

The AE/AWB evaluation circuit 134 integrates a part of the AE/AWB evaluation image data belonging to a photometric/white balance area EWA shown in FIG. 15(C), out of the AE/AWB evaluation image data outputted from the evaluation-image creating circuit 128, at each generation of the vertical synchronization signal Vsync, and outputs an integral value, i.e., an AE/AWB evaluation value. The CPU 136 executes an AE/AWB process in order to calculate a proper EV value and a proper white balance adjustment gain based on the AE/AWB evaluation value outputted from the AE/AWB evaluation circuit 134. An aperture amount and an exposure time that define the calculated proper EV value are set to the drivers 120*c* and 120*d*, respectively, and the calculated proper white balance adjustment gain is set to the post-processing circuit 144. As a result, the brightness and the white balance of the moving image outputted from the LCD monitor 148 is adjusted moderately.

The AF evaluation circuit 132 extracts a part of the EIS/AF evaluation image data belonging to a focus area FA shown in FIG. 15(B), out of the EIS/AF evaluation image data outputted from the evaluation-image creating circuit 126, and integrates a high-frequency component of the extracted EIS/AF evaluation image data in response to the vertical synchronization signal Vsync. The calculated integral value, i.e., the AF evaluation value, is applied to the CPU 136 for a continuous AF process. The CPU 136 references the applied AF evaluation value so as to continually search a focal point by a so-called hill-climbing process. The focus lens 114 is placed at the discovered focal point.

When the zoom button 138*z* on the key input device 138 is operated, the CPU 136 sets a display magnification different by a predetermined amount (minute amount) in a desired direction than a display magnification at the current time point, as a target display magnification, and calculates an optical zoom magnification, a RAW zoom magnification, and a YUV magnification, corresponding to the set target display magnification.

Subsequent thereto, the CPU 136 sets the calculated optical zoom magnification, RAW zoom magnification, and YUV zoom magnification, to the driver 120*a*, the zoom circuit 124*z*, and the zoom circuit 144*z*, respectively, in order to execute the zoom process. Thereby, a through image having the target display magnification is outputted from the LCD monitor 148.

Thereafter, the CPU 136 changes settings of the motion detection areas MD11 to MD19, the focus area FA, and the photometric/white balance area EWA so as to be adapted to the RAW zoom magnification set to the zoom circuit 124*z* and the YUV zoom magnification set to the zoom circuit 144*z*. This improves the accuracy of the image stabilizing process, the continuous AF process, and the AE/AWB process.

When a movie button 138*m* on the key input device 138 is operated, the CPU 136 applies a recording start command to an I/F 150 to start a moving-image recording process. The I/F 150 creates a moving image file within a recording medium 152, cyclically reads out the image data accommodated in the moving image area 142*b*, and writes the read-out image data into the moving image file within the recording medium 152. When the movie button 138*m* is operated again, a recording stop command is applied to the I/F 150. The I/F 150 ends reading-out of the image data from the moving image area 142*b*, and closes the moving image file of a write destination. Thereby, the moving image file is completed.

When the shutter button 138*s* on the key input device 138 is operated while the moving-image recording process is being executed, the CPU 136 applies a still-image extraction command to the post-processing circuit 144 in order to execute a parallel-still-image recording process, and also applies a still-image recording command to the I/F 150. The post-processing circuit 144 outputs one frame of image data representing an object scene image at a time point when the shutter button 138*s* is operated, from a still-image output terminal S_OUT. The outputted image data is written into the still image area 142*b* of the SDRAM 142 through the memory control circuit 140. The I/F 150 reads out the image data accommodated in the still image area 142*c* through the memory control circuit 140, and creates a stiff image file containing the read-out image data within the recording medium 152.

On the other hand, when the shutter button 138*s* is operated in a state that the moving-image recording process is interrupted, the CPU 136, in order to execute an independent still-image recording process, sets the RAW zoom magnification and the YUV zoom magnification, both indicating "1.0", to the zoom circuits 124*z* and 144*z* and applies the stiff-image processing command and the still-image recording command to the preprocessing circuit 124, the post-processing circuit 144, and the I/F 150.

Thereby, one frame of raw image data having a resolution of horizontal 3072 pixels×vertical 1728 pixels is outputted from the pre-processing circuit 124, and written into the raw image area 142*a* of the SDRAM 142.

The post-processing circuit 144 reads out the raw image data having the same resolution from the raw image area 142*a*, and outputs image data of a YUV format based on the read-out raw image data, from the still-image output terminal S_OUTS The outputted image data is written into the still image area 142*c* of the SDRAM 142 through the memory control circuit 140.

The I/F 150 reads out the image data accommodated in the still image area 142*c* through the memory control circuit 140, and creates a stiff image file containing the read-out image data within the recording medium 152. Upon completion of the recording, the above-mentioned through-image process is resumed.

Figure 16:
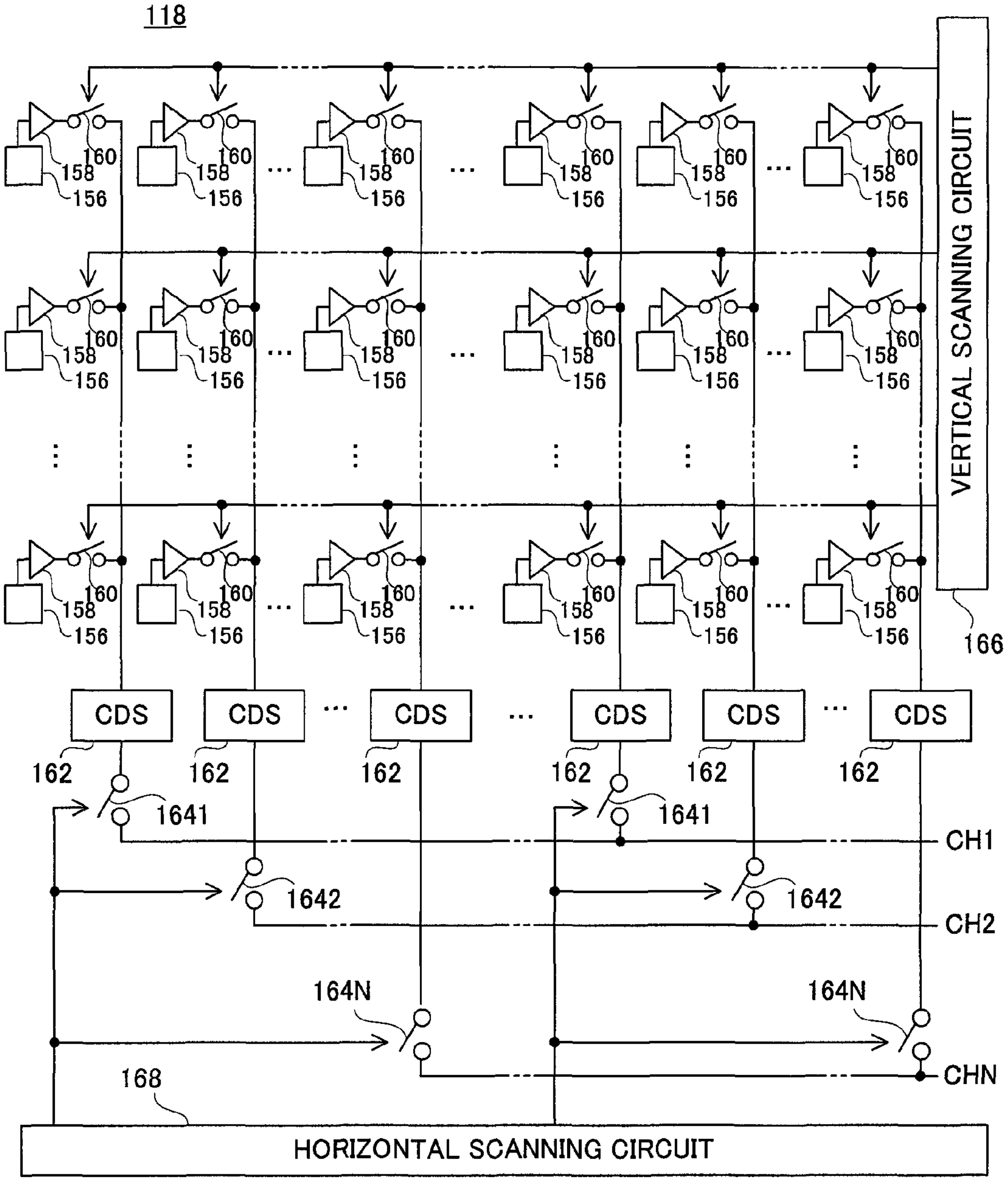
FIG. 16 is a block diagram showing one example of a configuration of an image sensor applied to the embodiment in FIG. 14.

The image sensor 118 is configured as shown in FIG. 16. The electric charges representing the object scene image is produced by a plurality of light-receiving elements 156, 156, . . . , placed in a matrix. Each light-receiving element 156 is equivalent to the above-mentioned pixel. Each light-receiving element 156, 156, . . . , forming a line in a vertical direction is connected to a common CDS circuit 162 via an A/D converter 158 and a row selection switch 160. The electric charges produced in the light-receiving element 156 are converted to 12-bit digital data by the A/D converter 158. A vertical scanning circuit 166 executes an operation for turning on/off the row selection switch 160, 160, . . . , in a raster scanning manner for each pixel, in order to expose the imaging surface in a focal-plane electronic shutter system. The noise included in the pixel data that has undergone the row selection switch 160 in an on state is removed by the CDS circuit 162.

A column selection switch 1641 is allocated to the CDS circuit 162 at an N*M+1-th column (M: 0, 1, 2, 3, . . . ), and a column selection switch 1642 is allocated to the CDS circuit 162 at an N*M+2-th column. Similarly, a column selection switch 164N is allocated to the CDS circuit 162 at an N*M+N-th column.

A horizontal scanning circuit 168 turns on the column selection switch 1641 at a timing at which the row selection switch 160 at the N*M+1-th column is turned on, and turns on the column selection switch 1642 at a timing at which the row selection switch 160 at the N*M+2-th column is turned on. Similarly, the horizontal scanning circuit 168 turns on the column selection switch 164N at a timing at which the row selection switch 160 at the N*M+N-th column is turned on.

As a result, partial raw image data based on the electric charges produced in the light-receiving element 156 at the N*M+1-th column is outputted from the channel CH1, and partial raw image data based on the electric charges produced in the light-receiving element 156 at the N*M+2-th column is outputted from the channel CH2. Partial raw image data based on the electric charges produced in the light-receiving element 156 at the N*M+N-th column is outputted from the channel CHN.

Figure 17:
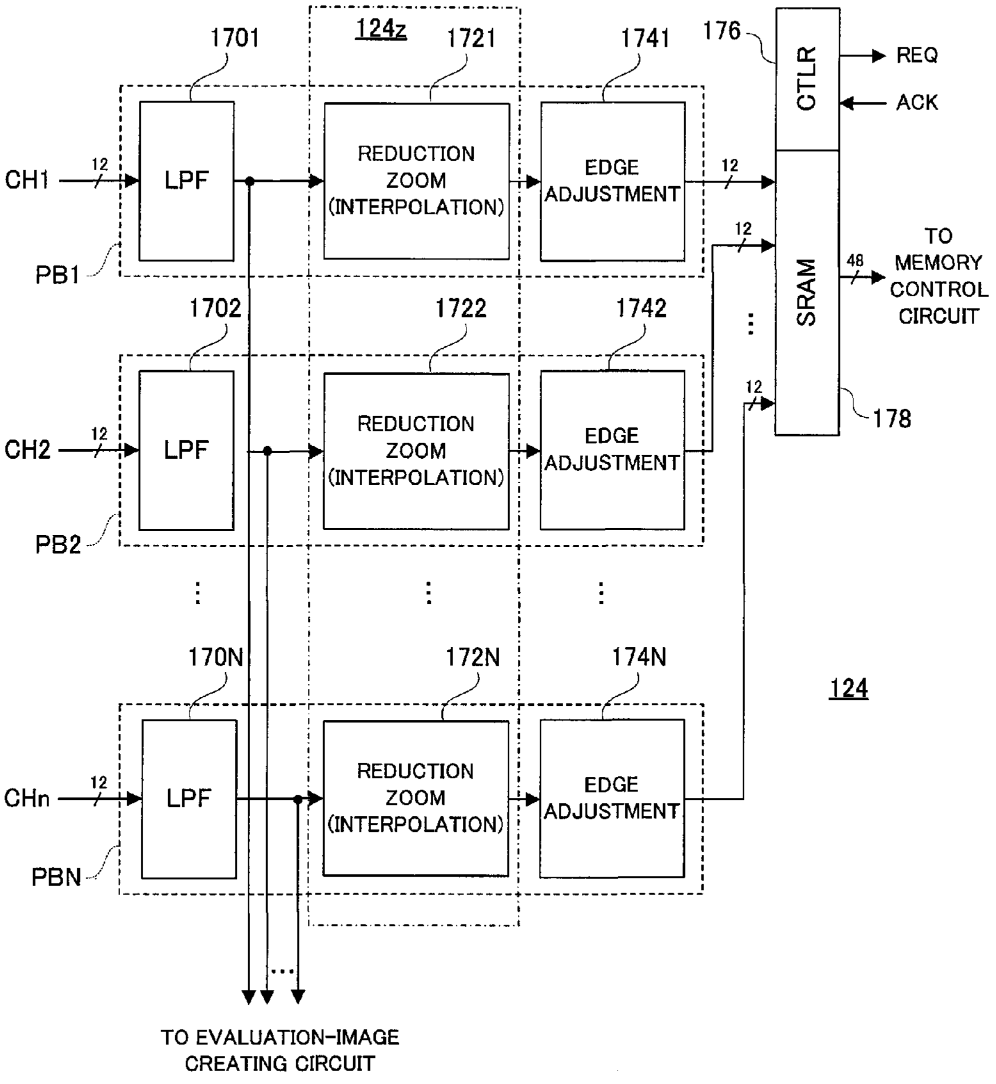
FIG. 17 is a block diagram showing one example of a configuration of a pre-processing circuit applied to the embodiment in FIG. 14.

The pre-processing circuit 124 is configured as shown in FIG. 17. The partial raw mage data of the channel CH1 is applied to the pre-processing block PB1, and the partial raw image data of the channel CH2 is applied to the pre-processing block PB2. The partial raw mage data of the channel CHN is applied to the pre-processing block PBN.

The pre-processing block PB1 is configured by an LPF 1701, a reduction zoom circuit 1721, and an edge adjustment circuit 1741. The pre-processing block PB2 is configured by an LPF 1702, a reduction zoom circuit 1722, and an edge adjustment circuit 1742. The pre-processing block PBN is configured by an LPF 170N, a reduction zoom circuit 172N, and an edge adjustment circuit 174N. It is noted that the zoom circuit 124*z* shown in FIG. 14 is configured by the reduction zoom circuits 1721 to 172N.

Therefore, the partial raw image data of each channel is subjected to a series of processes of a noise removal, a reduction zoom, and an edge adjustment, in parallel to one another. The partial raw image data on which the noise removal is performed is outputted toward the evaluation-image creating circuits 126 and 128, while the partial raw image data on which the edge adjustment is performed is written into the SDRAM 178. A controller 176 issues a write request toward the memory control circuit 140 each time an amount of data accommodated in the SDRAM 178 reaches a threshold value, and when an acknowledge signal is sent back from an issuing destination, outputs a predetermined amount of raw image data toward the memory control circuit 140.

A process for setting a zoom magnification in response to the operation of the zoom button 138*z* and a process for setting the motion detection areas MD11 to MD19, the focus area FA, and the photometric/white balance area EWA with reference to the RAW zoom magnification are executed in a manner described below. When a target display magnification is set, the optical zoom magnification, the RAW zoom magnification, and the YUV zoom magnification are calculated with reference to a graph shown in FIG. 18. It is noted that data equivalent to the graph shown in FIG. 18 is saved in a flash memory 154 as graph data GRD1.

Figure 18:
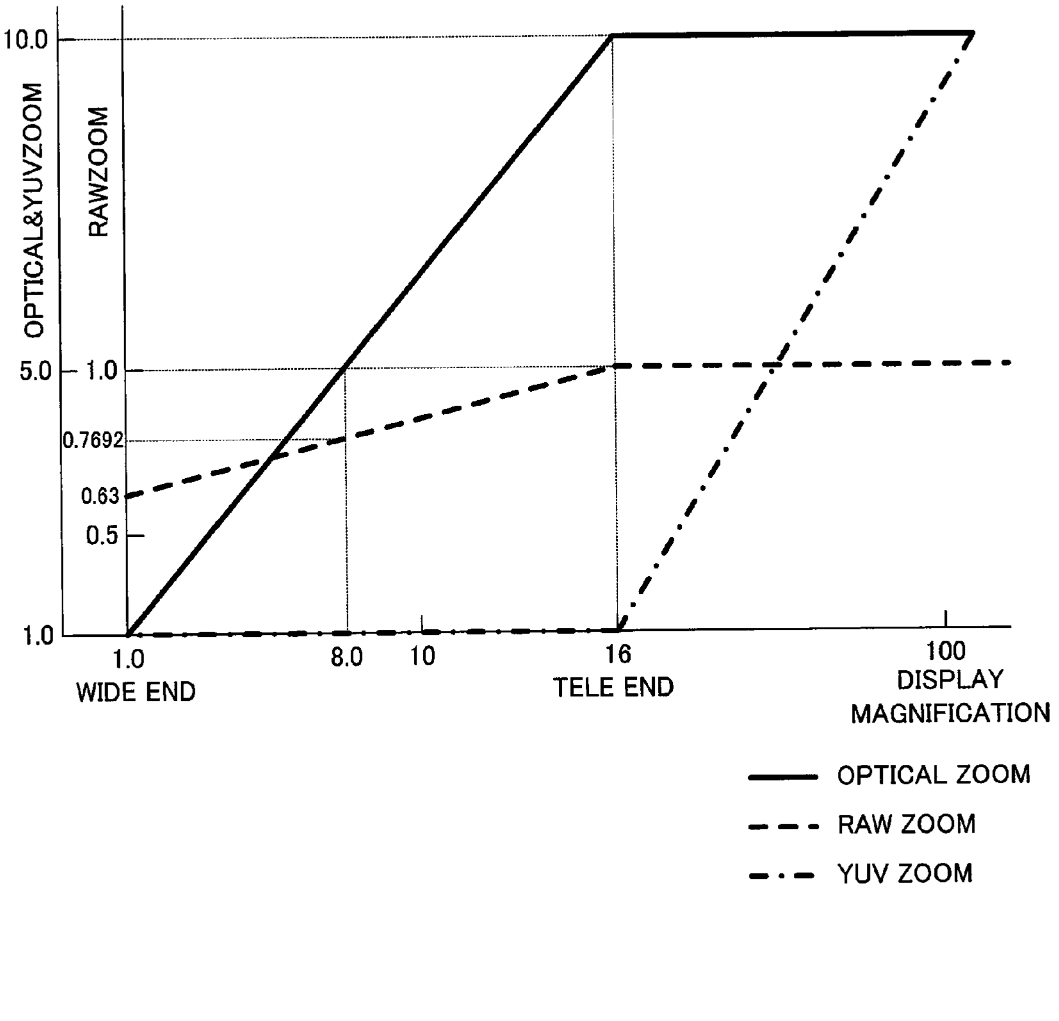
FIG. 18 is a graph showing one example a zoom magnification characteristic.

According to FIG. 18, the optical zoom magnification indicates “1.0” when the zoom lens 112 is positioned at a wide end, and indicates “10.0” when the zoom lens 112 is positioned at a tele end. Furthermore, the optical zoom magnification increases linearly as the zoom lens 112 moves from the wide end to the tele end, and is maintained at “10.0” in a range that the display magnification exceeds “16”. The YUV zoom magnification is maintained at “1.0” in a range that the display magnification is equal to or less than “16”, and increases linearly up to “10.0” in a range that the display magnification exceeds “16”.

The RAW zoom magnification indicates “0.625” corresponding to the display magnification=1.0 (zoom lens 12=wide end), and indicates “1.0” corresponding to the display magnification=16 (zoom lens 12=tele end). Furthermore, the RAW zoom magnification increases linearly as the display magnification moves from “1.0” toward “16”, and is maintained at “1.0” in a range that the display magnification exceeds “16”.

When a target display magnification is set to “1.0”, “1.0” is calculated as the optical zoom magnification, “0.625” is calculated as the RAW zoom magnification, and “1.0” is calculated as the YUV zoom magnification. Furthermore, when the target display magnification is set to “8.0”, “5.0” is calculated as the optical zoom magnification, “0.7692” is calculated as the RAW zoom magnification, and “1.0” is calculated as the YUV zoom magnification. Also, when the target display magnification is set to “16”, “10.0” is calculated as the optical zoom magnification, “1.0” is calculated as the RAW zoom magnification, and “1.0” is calculated as the YUV zoom magnification.

The optical zoom magnification, the RAW zoom magnification, and the YUV zoom magnification thus calculated are set to the driver 120*a*, the zoom circuit 124*z*, and the zoom circuit 144*z*, respectively. Furthermore, the motion detection areas MD11 to MD19, the focus area FA, and the photometric/white balance area EWA are allocated to the imaging surface in a mode different depending on the value of the set RAW zoom magnification.

Figure 19:
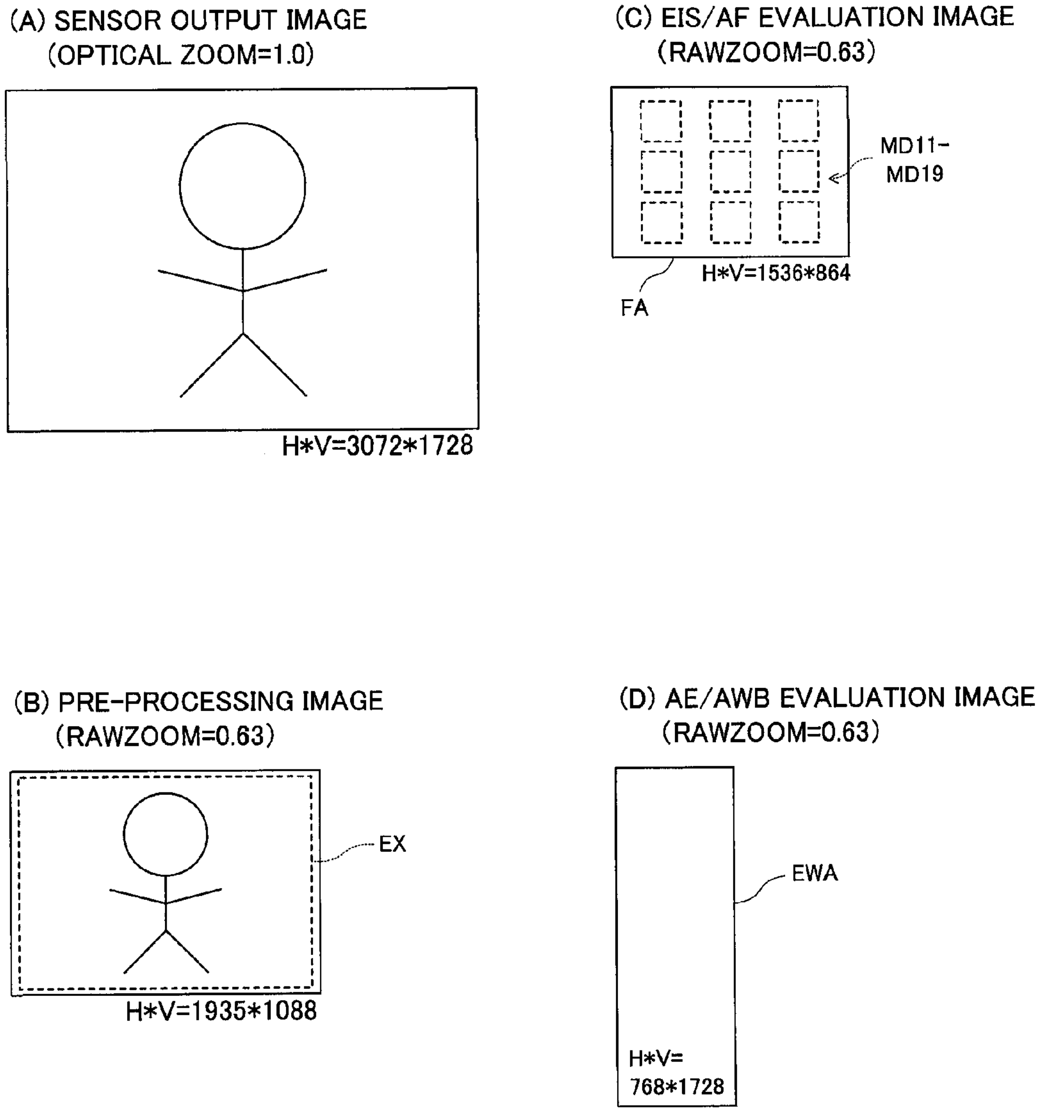
FIG. 19(A) is an illustrative view showing one example of an image outputted from an image sensor.
FIG. 19(B) is an illustrative view showing one example of an image outputted from the pre-processing circuit.
FIG. 19(C) is an illustrative view showing one example of a resolution of an EIS/AF evaluation image.
FIG. 19(D) is an illustrative view showing one example of a resolution of an AE/AWB evaluation image.

When the raw image data shown in FIG. 19(A) is outputted from the image sensor 118 corresponding to the optical zoom magnification “1.0”, raw image data having a size as shown in FIG. 19(B) (=horizontal 1935 pixels×vertical 1088 pixels) is outputted from the pre-processing circuit 124. The post-processing circuit 144 performs a post process on a part of the raw image data belonging to the extraction area EX (size: horizontal 1920 pixels×vertical 1080 pixels), out of the raw image data shown in FIG. 19(B). Because the YUV zoom magnification is “1.0”, an image of an angle of view equivalent to the extraction area EX is displayed on the LCD monitor 148.

Furthermore, as shown in FIG. 19(C), the focus area FA is allocated to the entire region of the EIS/AF evaluation image, and the motion detection areas MD11 to MD19 are allocated on the EIS/AF evaluation image so as to establish a predetermined relationship with the focus areas FA. Furthermore, as shown in FIG. 19(D), the photometric/white balance area EWA is allocated to the entire area of the AE/AWB evaluation image.

Figure 20:
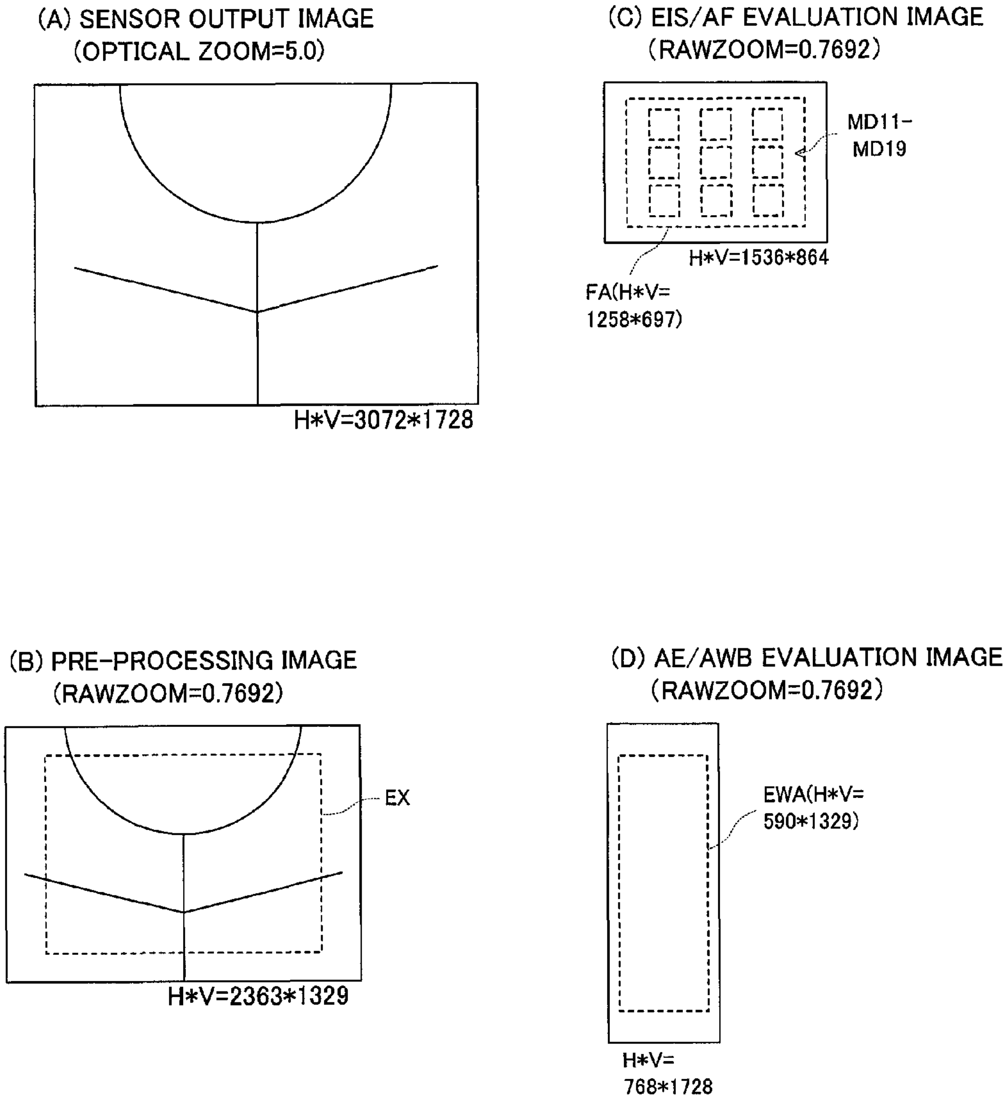
FIG. 20(A) is an illustrative view showing another example of an image outputted from an image sensor.
FIG. 20(B) is an illustrative view showing another example of an image outputted from the pre-processing circuit.
FIG. 20(C) is an illustrative view showing another example of a resolution of an EIS/AF evaluation image.
FIG. 20(D) is an illustrative view showing another example of a resolution of an AE/AWB evaluation image.

When the optical zoom magnification is changed to "5.0", the raw image data shown in FIG. 20(A) is outputted from the image sensor 118. Because the RAW zoom magnification is changed to "0.7692", raw image data having a size as shown in FIG. 20(B) (=horizontal 2363 pixels×vertical 1329 pixels) is outputted from the pre-processing circuit 124. The post-processing circuit 144 performs a post process on a part of the raw image data belonging to the extraction area EX, out of the raw image data shown in FIG. 20(B). The YUV zoom magnification is "1.0", and as a result, a through image of an angle of view equivalent to the extraction area EX shown in FIG. 20(B) is displayed on the LCD monitor 148.

Furthermore, with reference to FIG. 20(C), a focus area FA having a size equivalent to horizontal 1258 pixels×vertical 697 pixels is allocated in the center of the EIS/AF evaluation image. The motion detection areas MD11 to MD19 are allocated on the EIS/AF evaluation image so as to establish a predetermined relationship with the focus areas FA. Furthermore, with reference to FIG. 20(D), the photometric/white balance area EWA, which has horizontal 590 pixels×vertical 1329 pixels, is allocated on the AE/AWB evaluation image.

Figure 21:
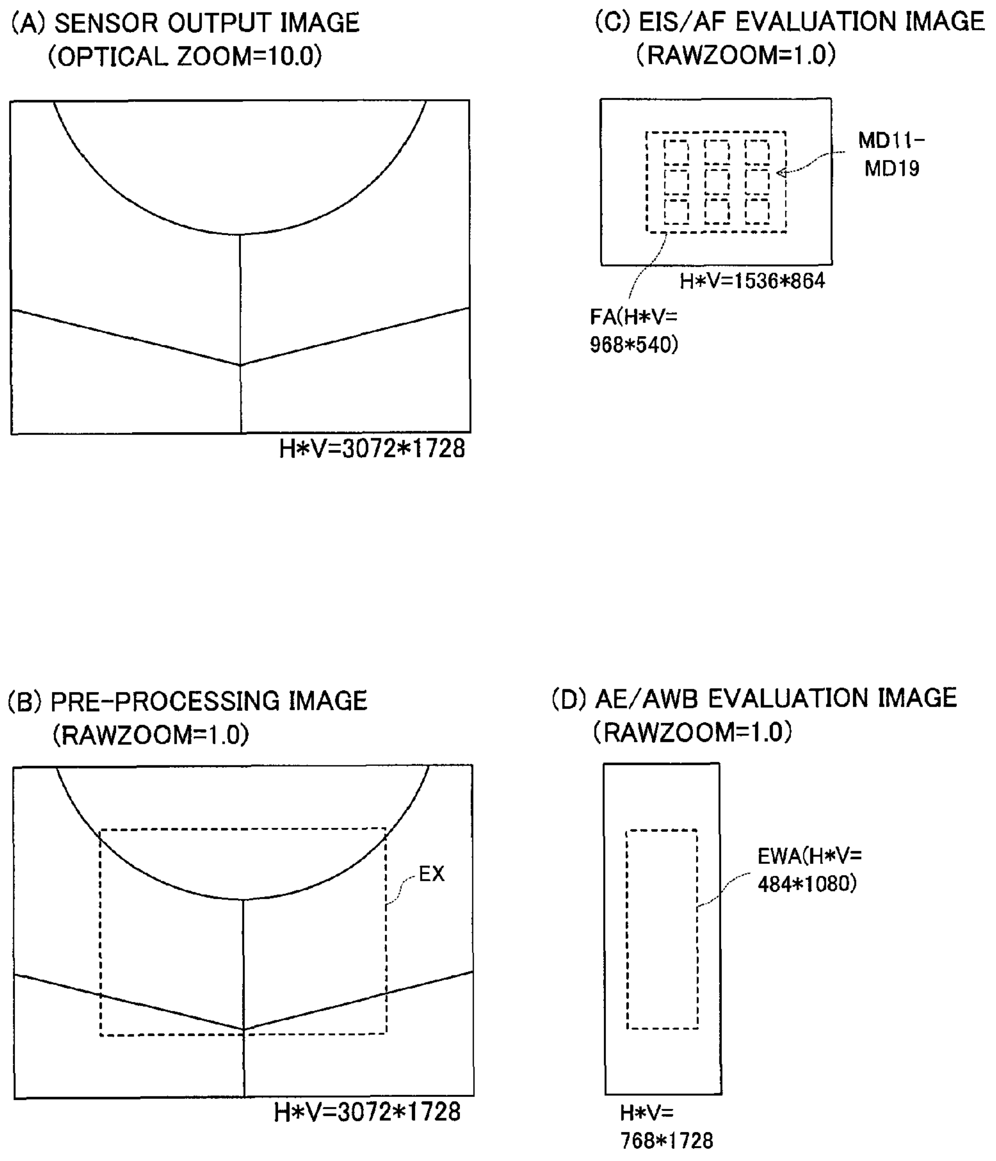
FIG. 21(A) is an illustrative view showing another example of an image outputted from an image sensor.
FIG. 21(B) is an illustrative view showing another example of an image outputted from the pre-processing circuit.
FIG. 21(C) is an illustrative view showing another example of a resolution of an EIS/AF evaluation image.
FIG. 21(D) is an illustrative view showing another example of a resolution of an AE/AWB evaluation image.

When the optical zoom magnification is changed to "10.0", raw image data shown in FIG. 21(A) is outputted from the image sensor 118. The RAW zoom magnification is changed to "1.0", and raw image data having a size as shown in FIG. 21(B) (=horizontal 3096 pixels×vertical 1728 pixels) is outputted from the pre-processing circuit 124. The post-processing circuit 144 performs a post process on a part of the raw image data belonging to the extraction area EX, out of the raw image data shown in FIG. 21(B). The YUV zoom magnification is "1.0", and as a result, a through image of an angle of view equivalent to the extraction area EX shown in FIG. 21(B) is displayed on the LCD monitor 148.

With reference to FIG. 21(C), a focus area FA having a size equivalent to horizontal 968 pixels×vertical 540 pixels is allocated in the center of the EIS/AF evaluation image. The motion detection areas MD11 to MD 19 are allocated on the EIS/AF evaluation image so as to establish a predetermined relationship with such a focus areas FA. Furthermore, with reference to FIG. 21(D), the photometric/white balance area EWA, which has horizontal 484 pixels×vertical 1080 pixels, is allocated on the AE/AWB evaluation image.

Thus, the RAW zoom magnification increases as the optical zoom magnification increases, and decreases as the optical zoom magnification decreases. Therefore, the angle of view of the object scene image based on the raw image data extracted by the post-processing circuit 144 is decreased by a rate exceeding a decrease rate caused due to the increase of the optical zoom magnification, and is increased by a rate exceeding an increase rate caused due to the decrease of the optical zoom magnification. As a result, in a low zoom magnification range, it is possible to secure a wide angle of view irrespective of the increase in the resolution of the imaging surface. Also, in a high zoom magnification range, a zoom effect is increased. Thus, it is possible to improve the reproducing performance of the object scene image.

Figure 22:
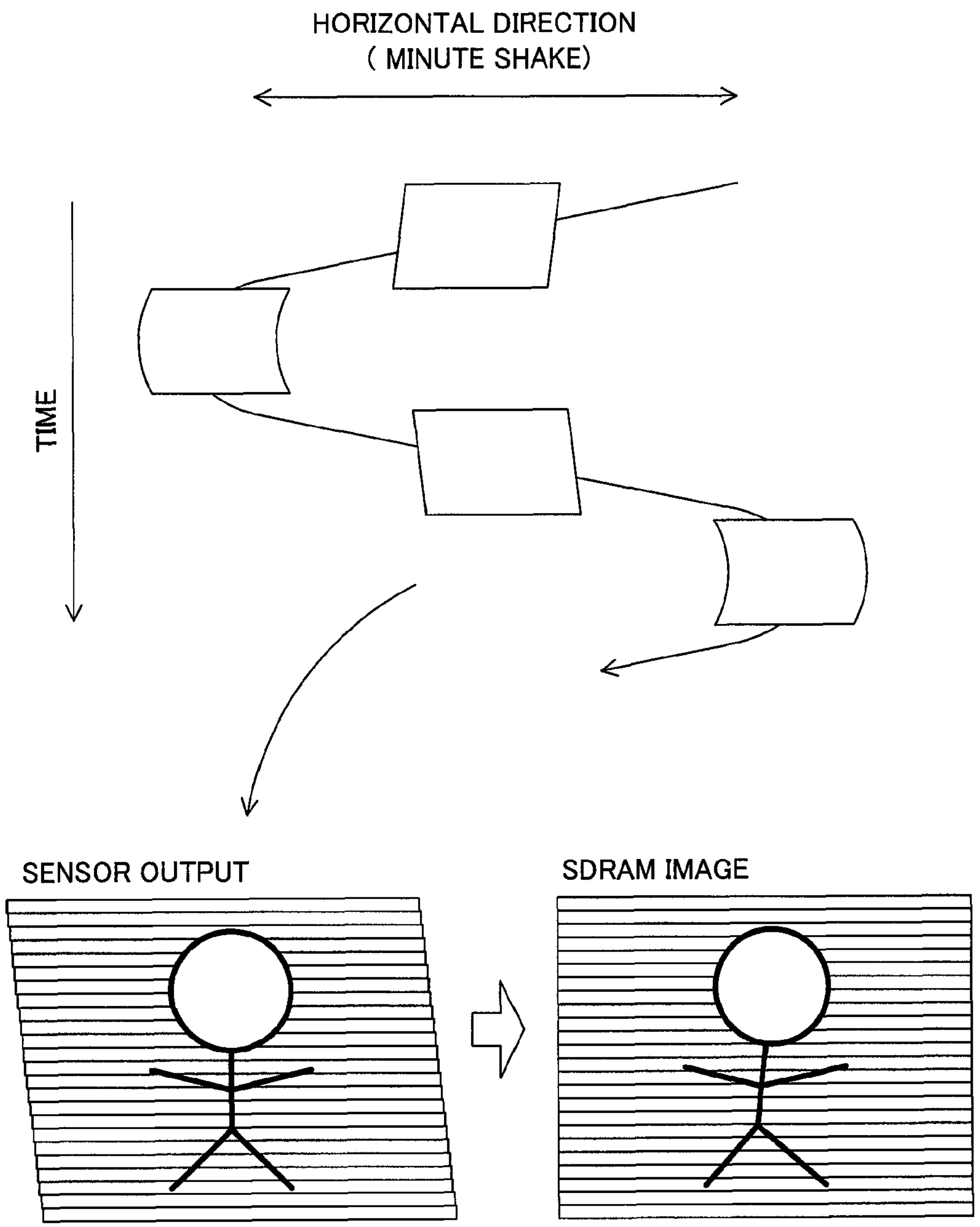
FIG. 22 is an illustrative view showing one example of an imaging operation in the embodiment in FIG. 14.

As described above, because the image sensor 116 exposes the imaging surface in a focal-plane electronic shutter system, the exposure timing varies depending on each horizontal pixel column. Then, due to the horizontal movement of the imaging surface, the focal plane distortion in a horizontal direction is generated in the raw image data accommodated in the raw image area 142*a* (See FIG. 22). Thus, the CPU 136 changes the shape of the extraction area EX so as to restrain the focus plane distortion, based on the resultant vectors UVC, MVC, and LVC fetched from the motion detecting circuit 130.

When the focal plane distortion is generated in a horizontal direction, the inclination amount of the right side and the left side of the rectangle representing the extraction area EX is changed in a manner shown in FIG. 23(A) to FIG. 23(D). That is, when the imaging surface moves in a right direction, the exposure timing of the imaging surface changes in a manner shown in a left column of FIG. 23(A), and therefore, the right side and the left side of the extraction area EX are inclined in a manner shown in a right column of FIG. 23(A). Also, when the imaging surface moves in a left direction, the exposure timing of the imaging surface changes in a manner shown in a left column of FIG. 23(B), and therefore, the right side and the left side of the extraction area EX are inclined in a manner shown in a right column of FIG. 23(B).

Figure 23:
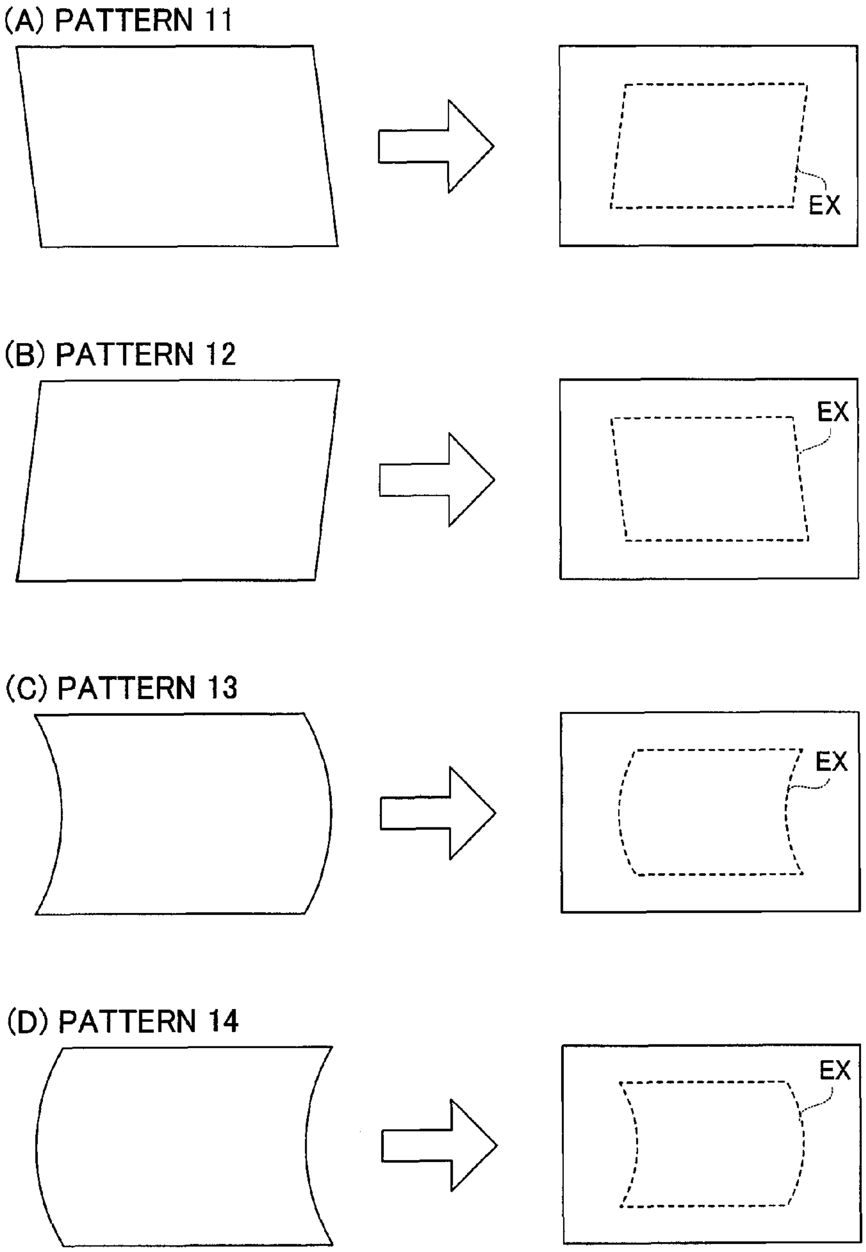
FIG. 23(A) is an illustrative view showing another example of a shape changing process of an extraction area.
FIG. 23(B) is an illustrative view showing stiff another example of the shape changing process of an extraction area.
FIG. 23(C) is an illustrative view showing yet still another example of the shape changing process of an extraction area.
FIG. 23(D) is an illustrative view showing yet still another example of the shape changing process of an extraction area.

Furthermore, when a moving direction of the imaging surface is inverted from right to left, the exposure timing of the imaging surface is changed in a manner shown in a left column of FIG. 23(C), and therefore, the right side and the left side of the extraction area EX are inclined in a manner shown in a right column of FIG. 23(C). Furthermore, when the moving direction of the imaging surface is inverted from left to right, the exposure timing of the imaging surface is changed in a manner shown in a left column of FIG. 23(D), and therefore, the right side and the left side of the extraction area EX are inclined in a manner shown in a right column of FIG. 23(D).

Figure 24:
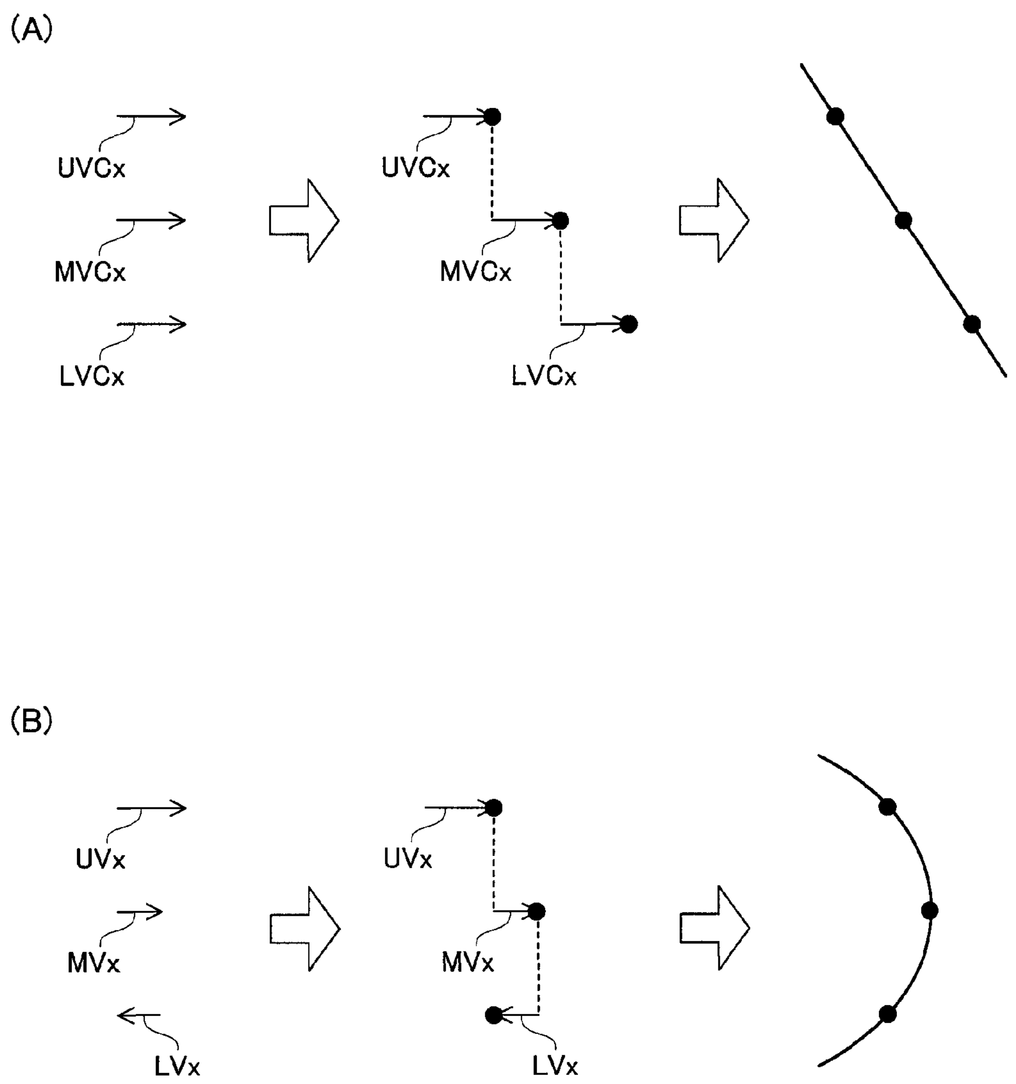
FIG. 24(A) is an illustrative view showing another example of an operation for determining inclination amounts of a left side and a right side of an extraction area.
FIG. 24(B) is an illustrative view showing stiff another example of the operation for determining inclination amounts of a left side and a right side of an extraction area.

The inclination amount is determined in a manner shown in FIG. 24(A) or FIG. 24(B), based on the resultant vectors UVC, MVC, and LVC outputted from the motion detecting circuit 122. Firstly, the horizontal components of the resultant motion vectors UVC, MVC, and LVC are specified as "UVCx", "MVCx", and "LVCx". Subsequently, a Y coordinate of the horizontal component UVCx is determined corresponding to vertical positions of the motion detection areas MD11 to MD13, a Y coordinate of the horizontal component MVCx is determined corresponding to vertical positions of the motion detection areas MD14 to MD16, and a Y coordinate of the horizontal component LVCx is determined corresponding to vertical positions of the motion detection areas MD17 to MD19.

Moreover, X coordinates at distal ends of the horizontal components UVCx, MVCx, and LVCx are determined such that an X coordinate at a proximal end of the horizontal component MVCx is coincident with that at a distal end of the horizontal component UVCx, and an X coordinate at a proximal end of the horizontal component LVCx is coincident with that at a distal end of the horizontal component MVCx. Thereafter, an approximate function representing a straight line or a curve linking the determined three XY coordinates is calculated.

Therefore, when the horizontal components UVCx, MVCx, and LVCx have a size shown in a left column of FIG. 24(A), the three XY coordinates are determined in a manner shown in a center column of FIG. 24(A), and an approximate function having an inclination shown in a right column of FIG. 24(A) is calculated. Furthermore, when the horizontal components UVCx, MVCx, and LVCx have a size shown in a left column of FIG. 24(B), three XY coordinates are determined in a manner shown in a center column of FIG. 24(B), and an approximate function having an inclination shown in a right column of FIG. 24(B) is calculated. The shape of the extraction area EX is changed with reference to the approximate functions thus calculated.

Figure 25:
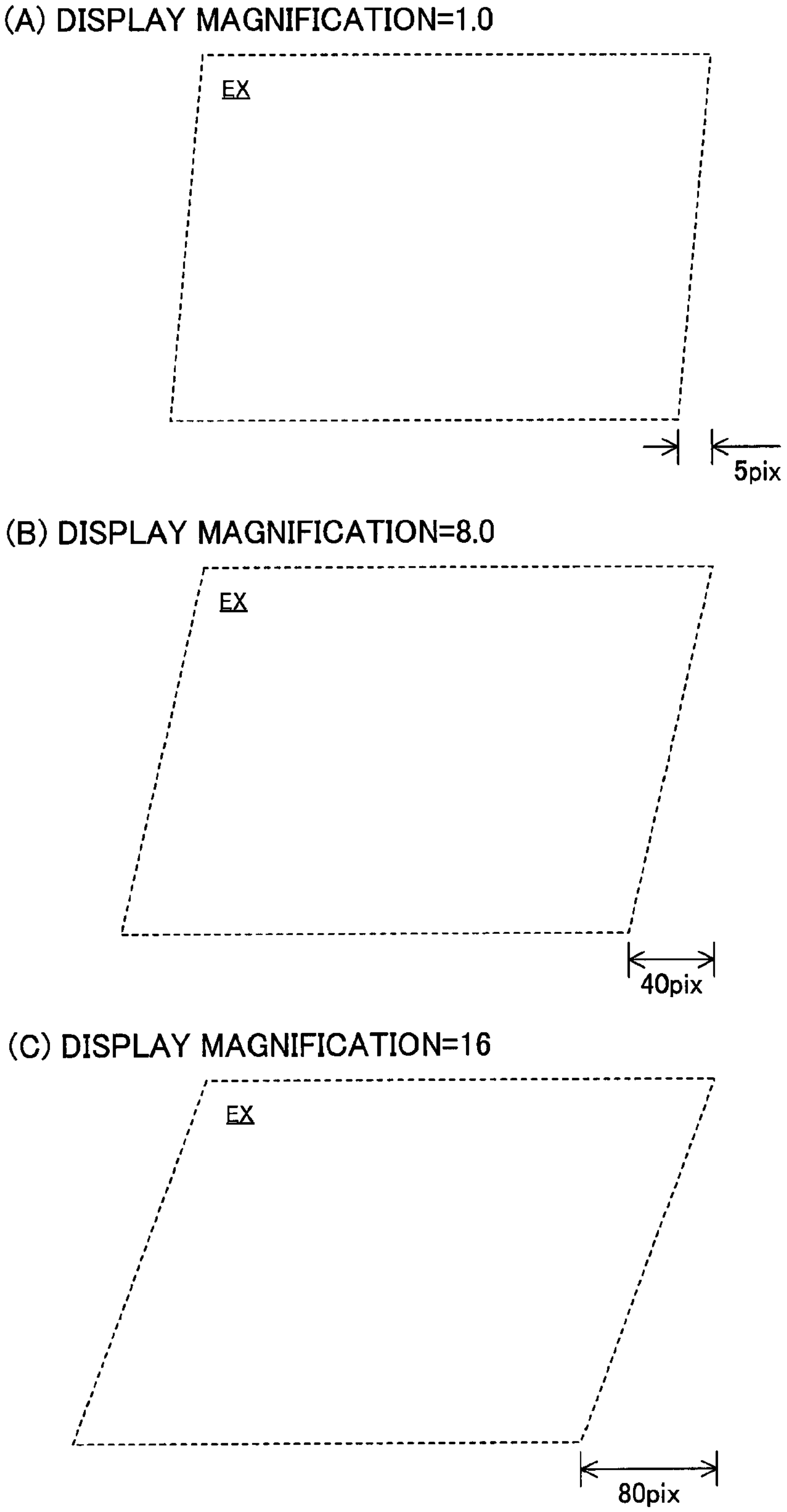
FIG. 25(A) is an illustrative view showing one example of a shape of an extraction area corresponding to a display magnification of "1.0"
FIG. 25(B) is an illustrative view showing one example of a shape of an extraction area corresponding to a display magnification of "8.0"
FIG. 25(C) is an illustrative view showing one example of a shape of an extraction area corresponding to a display magnification of "16"

When a camera shake occurs, the imaging surface vibrates by about a maximum of 10 Hz. Then, in the extraction area EX, an inclination equivalent to a maximum of horizontal five pixels is generated corresponding to a display magnification of "1.0", an inclination equivalent to a maximum of horizontal 40 pixels is generated corresponding to a display magnification of "8.0", and an inclination equivalent to a maximum of horizontal 80 pixels is generated corresponding to a display magnification of "16" (see FIG. 25(A) to FIG. 25(C)).

On the other hand, although a size of the raw image data is changed in response to the operation of the zoom button 138*z*, the size exceeds the size of the extraction area EX in the entire region of the zoom range. In particular, when the display magnification of "1.0" is set, a margin of 15 pixels is secured in a horizontal direction, as shown in FIG. 19(B). As a result, it becomes also possible to correct the focal plane distortion even by the minimum display magnification.

However, a movable range of the extraction area EX decreases corresponding to such deformation of the extraction area EX. That is, the movable range of the extraction area EX decreases by a maximum of horizontal 15 pixels corresponding to the display magnification of "1.0", decreases by a maximum of horizontal 42 pixels corresponding to a display magnification of "8.0", and decreases by a maximum of horizontal 64 pixels corresponding to a display magnification of "16".

Figure 26:
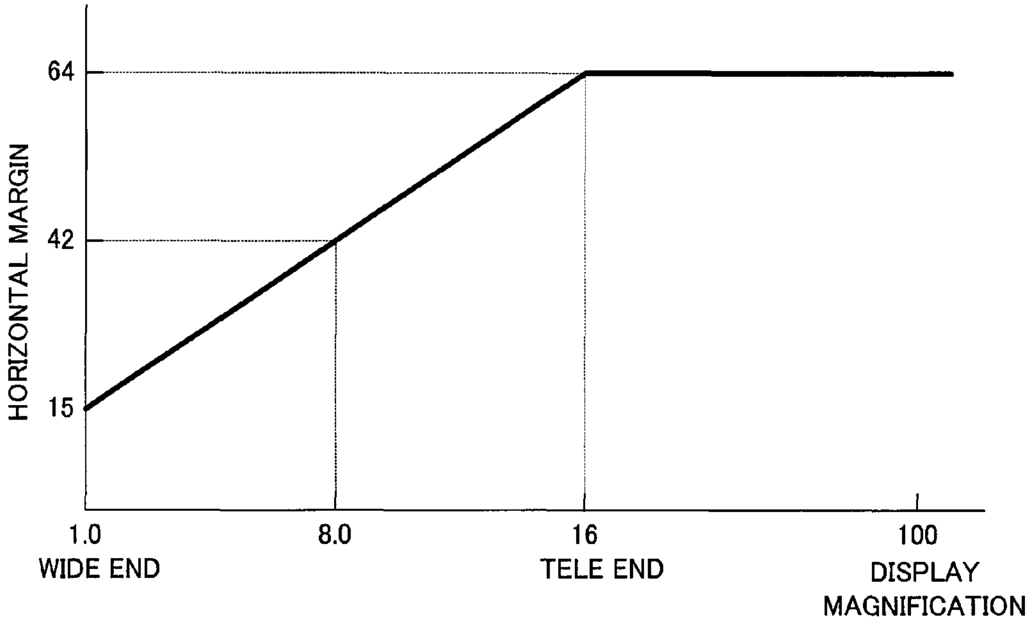
FIG. 26 is a graph showing one example of a horizontal margin characteristic.

Therefore, with reference to a graph shown in FIG. 26, the CPU 136 specifies a horizontal margin corresponding to the target display magnification so as to determine a moving amount of the extraction area EX with reference to the specified horizontal margin. The moving amount of the extraction area EX is equivalent to an amount obtained by deducting the horizontal margin from the horizontal component of the total motion vector. Thereby, it becomes possible to avoid a situation where a part of the extraction area EX swerves from the raw image area 142*a*. It is noted that data corresponding to values in the graph shown in FIG. 26 are saved in the flash memory 154 as graph data GRD2.

Figure 27:
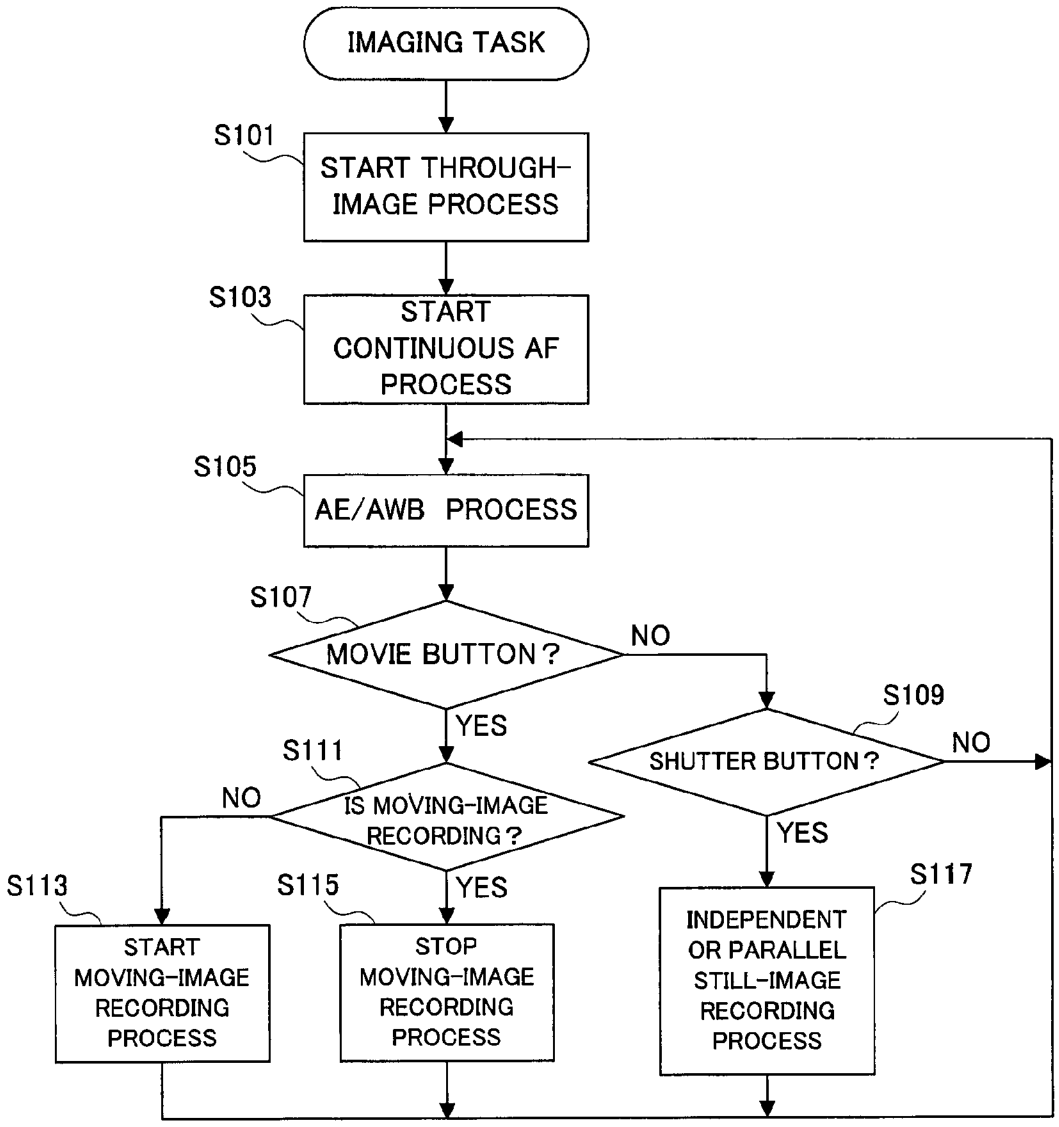
FIG. 27 is a flowchart showing another portion of the operation of the CPU applied to the embodiment in FIG. 14.
Figure 28:
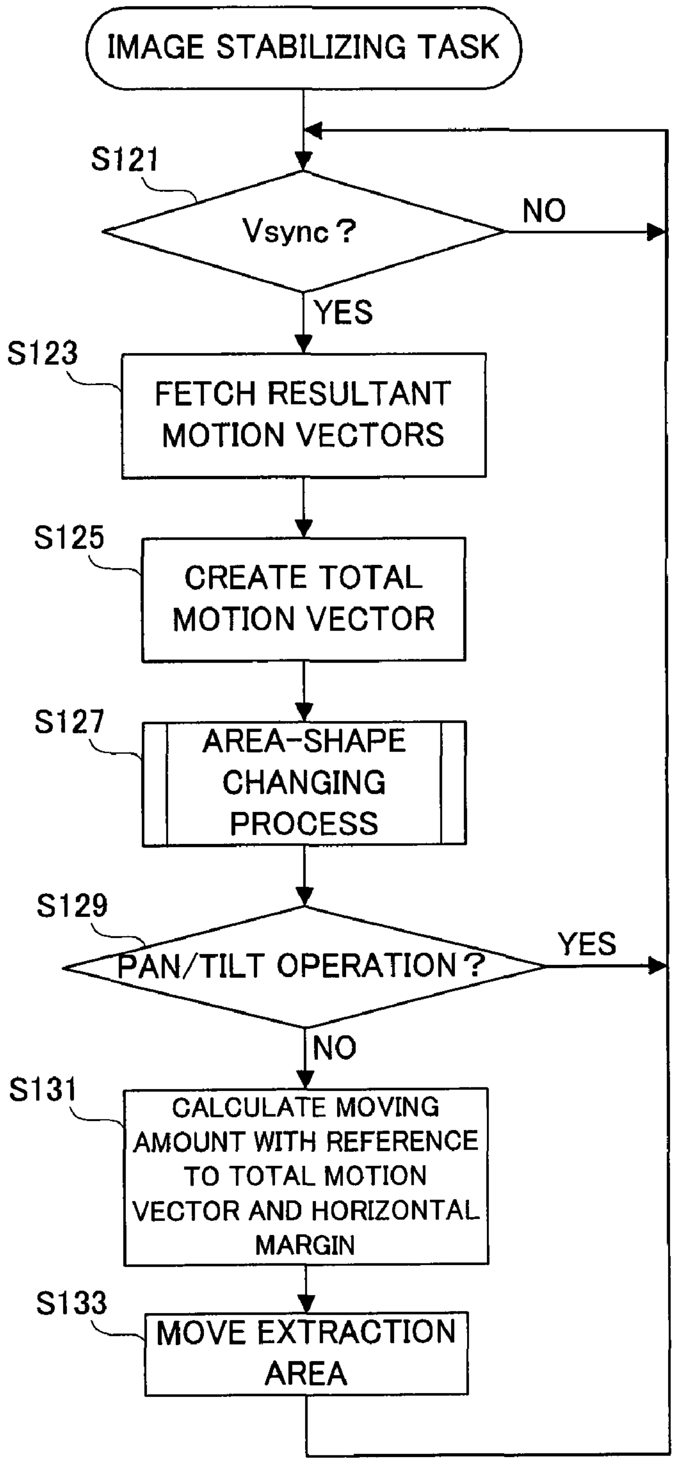
FIG. 28 is a flowchart showing stiff another portion of the operation of the CPU applied to the embodiment in FIG. 14.
Figure 29:
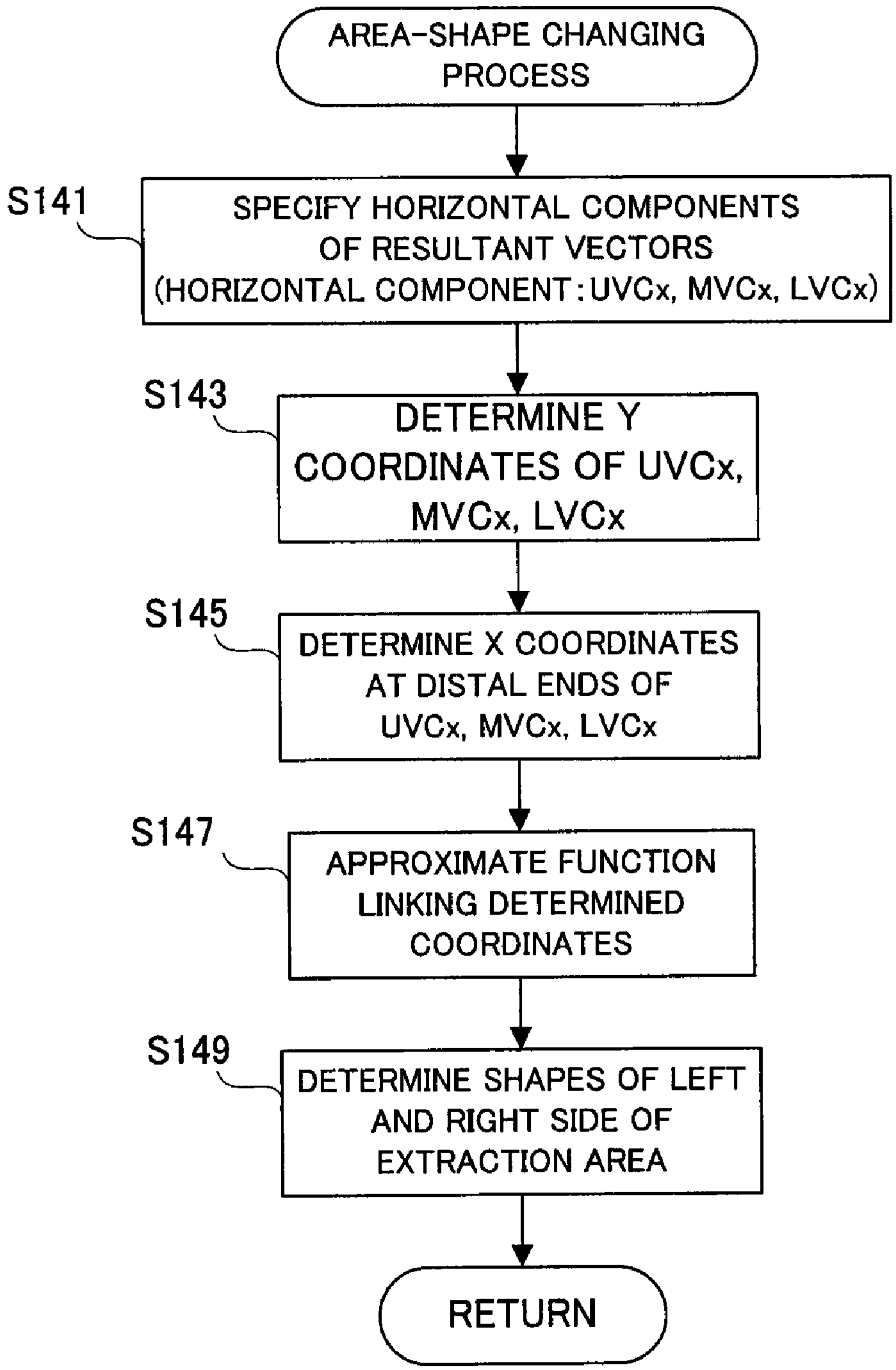
FIG. 29 is a flowchart showing yet stiff another portion of the operation of the CPU applied to the embodiment in FIG. 14.
Figure 30:
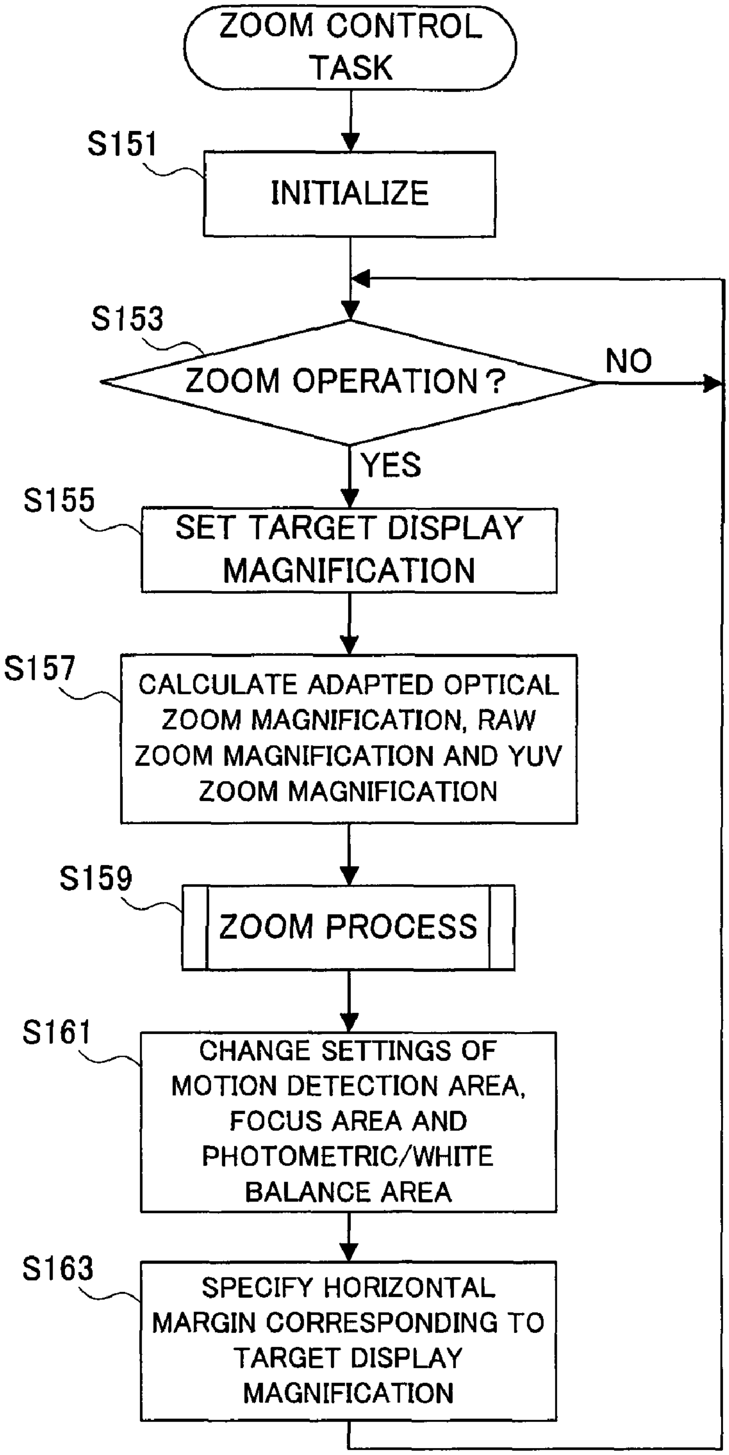
FIG. 30 is a flowchart showing yet stiff another portion of the operation of the CPU applied to the embodiment in FIG. 14.
Figure 31:
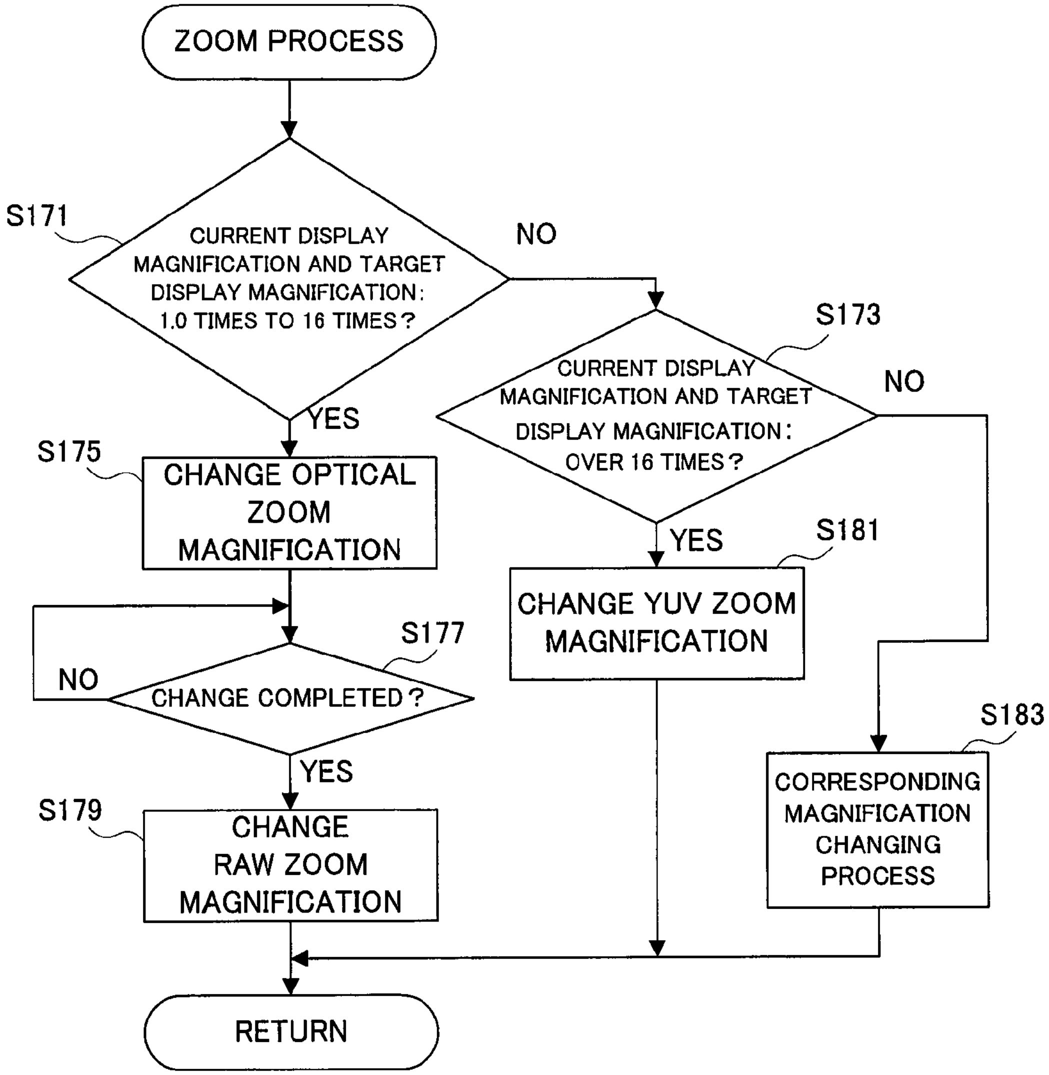
FIG. 31 is a flowchart showing stiff another portion of the operation of the CPU applied to the embodiment in FIG. 14.

The CPU 136 executes in parallel a plurality of tasks including an imaging task shown in FIG. 27, an image stabilizing task shown in FIG. 28 and FIG. 29, and a zoom control task shown in FIGS. 30 and 31. It is noted that control programs corresponding to these tasks are stored in the flash memory 154.

With reference to FIG. 27, a through-image process is started in a step S101, and a continuous AF process is started in a step S103. As a result of the process in the step S101, raw image data having a resolution of horizontal 3072 pixels× vertical 1928 pixels is outputted from the image sensor 118 at every 1/30 seconds, and a through image based on this raw image data is outputted from the LCD monitor 148. Also, as a result of the process in the step S103, the position of the focus lens 114 is adjusted continuously.

In a step S105, the AE/AWB process is executed. As a result, the brightness and the white balance of the through image are adjusted moderately. In a step S107, it is determined whether or not the movie button 38*m* is operated, and in a step S109, it is determined whether or not the shutter button 138*s* is operated.

When the movie button 138*m* is operated, the process proceeds to a step S111 from the step S107 so as to determine whether or not the moving-image recording process is being executed. When NO is determined in this step, the moving-image recording process is started in a step S113, and on the other hand, when YES is determined, the moving-image recording process is stopped in a step S115. Upon completion of the process in the step S113 or S115, the process returns to the step S105. When the shutter button 138*s* is operated, the independent still-image recording process or the parallel still-image recording process is executed in a step S117, and thereafter, the process returns to the step S105.

With reference to FIG. 28, it is determined whether or not the vertical synchronization signal Vsync is generated in a step S121, and when YES is determined, the resultant motion vectors UVC, MVC, and LVC are fetched from the motion detecting circuit 130 in a step S123. In a step S125, the total motion vector is created based on the fetched resultant motion vectors UVC, MVC, and LVC. In a step S127, the area-shape changing process is executed, and in a subsequent step S129, it is determined whether or not the motion of the imaging surface at the current time point is caused due to the pan/tilt operation based on the total motion vector. When YES is determined in this step, the process returns as it is to the step S101. When NO is determined, the process proceeds to a step S131 so as to calculate the moving amount of the extraction area EX with reference to the total motion vector created in the step S125 and a horizontal margin specified in a step S163 described later. The moving amount is equivalent to an amount obtained by deducting the horizontal margin from the horizontal component of the total motion vector. In a step S133, the extraction area EX is moved according to the calculated moving amount, and thereafter, the process returns to the step S121.

The area-shape changing process in the step S127 is executed according to a sub-routine shown in FIG. 29. Firstly, in a step S141, the horizontal components of the resultant motion vectors UVC, MVC, and LVC are specified as "LCx", "MVCx", and "LVCx". In a step S143, a Y coordinate of the horizontal component UVCx is determined corresponding to vertical positions of the motion detection areas MD11 to MD13, a Y coordinate of the horizontal component MVCx is determined corresponding to vertical positions of the motion detection areas MD14 to MD16, and a Y coordinate of the horizontal component LVCx is determined corresponding to vertical positions of the motion detection areas MD17 to MD19.

In a step S145, X coordinates at distal ends of the horizontal components UVCx, MVCx, and LVCx are determined such that an X coordinate at the proximal end of the horizontal component MVCx is coincident with that at the distal end of the horizontal component UVCx, and an X coordinate at the proximal end of the horizontal component LVCx is coincident with that at the distal end of the horizontal component MVCx. In a step S147, an approximate function that represents a straight line or a curve linking the determined three XY coordinates is calculated, and in a step S149, inclination amounts of the right side and the left side of the extraction area EX are determined according to the calculated approximate function. Upon completion of the process in the step S149, the process is restored to a routine at a hierarchical upper level.

With reference to FIG. 30, zoom settings are initialized in a step S151, and in a step S153, it is determined whether or not the zoom button 138*z* is operated. When a determination result is updated from NO to YES, the process proceeds to a step S155 so as to set a display magnification different depending on each operation mode of the zoom button 138*z* as the target display magnification. In a step S157, with reference to the graph shown in FIG. 18, an optical zoom magnification, a RAW zoom magnification, and a YUV zoom magnification, each of which corresponds to the target display magnification, are calculated.

In a step S159, in order to execute the zoom process, the calculated optical zoom magnification, RAW zoom magnification, and YUV zoom magnification are set to the driver 120a, the zoom circuit 124z, and the zoom circuit 144z, respectively. Thereby, a through image having the target display magnification is outputted from the LCD monitor 148.

In a step S161, settings of the motion detection areas MD11 to MD19, the focus area FA, and the photometric/white balance area EWA are changed to be adapted to the RAW zoom magnification set in the step S159. As a result, the image stabilizing process, the continuous AF process, and the AE/AWB process are executed highly accurately. In the step S163, the horizontal margin corresponding to the target display magnification is specified with reference to the graph shown in FIG. 26. Upon completion of the process in the step S163, the process returns to the step S153.

The zoom process in the step S159 is executed according to a sub-routine shown in FIG. 31. Firstly, it is determined in a step S171 whether or not both the current display magnification and the target display magnification are within a range between 1.0 times to 16 times, and then, it is determined in a step S173 whether or not both the current display magnification and the target display magnification are in a range exceeding 16 times.

When YES is determined in the step S171, the optical zoom magnification is changed in a step S175. Upon completion of the changing operation of the optical zoom magnification, YES is determined in a step S177, and the RAW zoom magnification is changed in a step S179. When YES is determined in the step S173, the YUV zoom magnification is changed in a step S181. When NO is determined in the step S173, the corresponding magnification changing process is executed in a step S183, regarding that both the current display magnification and the target display magnification exceed 16 times. Upon completion of the process in the steps S179 to S183, the process is restored to a routine at a hierarchical upper level.

As is understood from the above description, the image sensor 118 exposes the imaging surface using the focal-plane electronic shutter system, and repeatedly outputs the images representing the object scene. The image outputted from the image sensor 118 is reduced by the zoom circuit 124z arranged in the pre-processing circuit 124. The memory control circuit 140 extracts a part of the reduced image belonging to the extraction area EX of a predetermined size, out of the reduced image created by the zoom circuit 124z. On the LCD monitor 148, the moving image based on the extracted reduced image is displayed.

The CPU 136 changes the shape of the extraction area EX so that the focal plane distortion is restrained (S127), and also, changes the position of the extraction area EX so that the motion of the imaging surface in a direction orthogonal to an optical axis is compensated (S133). Also, upon receipt of the zoom operation, the CPU 136 changes the size of the reduced image created by the zoom circuit 124z in a range exceeding a predetermined size (S179).

By changing the size of the reduced image in a range exceeding the predetermined size, it becomes possible to execute an image-quality correcting process that affects the angle of view, such as movement and/or deformation of the extraction area EX, in the entire region of the zoom range. This improves the reproducing performance of the object scene image. Also, by simultaneously executing the image stabilizing process and the focal-plane distortion correction, it becomes possible to shorten a time period required for the process.

It is noted that in this embodiment, the CMOS-type image sensor is used. However, instead thereof, a CCD-type image sensor may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:

an imager which repeatedly outputs an electronic image produced on an imaging surface by an exposure operation of a focal-plane electronic shutter system in a raster scanning manner;

an extractor which extracts a partial image belonging to a rectangular designated area having a left side and a right side, out of the electronic image outputted from said imager;

an outputter which outputs a moving image based on the partial image extracted by said extractor;

a detector which detects motion of said imaging surface in a direction orthogonal to an optical axis;

a position changer which changes a position of the designated area so that the motion detected by said detector is compensated; and an inclination amount changer which changes inclination amounts of the right side and the left side so that a focal plane distortion in a horizontal direction is restrained based on a horizontal component of the motion detected by said detector.

2. A video camera comprising:

an imager which repeatedly outputs an electronic image produced on an imaging surface by an exposure operation of a focal-plane electronic shutter system in a raster scanning manner;

an extractor which extracts a partial image belonging to a designated area, out of the electronic image outputted from said imager;

an outputter which outputs a moving image based on the partial image extracted by said extractor;

a detector which detects motion of said imaging surface in a direction orthogonal to an optical axis;

a position changer which changes a position of the designated area so that the motion detected by said detector is compensated; and a shape changer which changes a shape of the designated area so that a focal plane distortion is restrained based on the motion detected by said detector, wherein the designated area is a rectangular area having a left side and a right side, and said shape changer includes an inclination amount changer which changes inclination amounts of the right side and the left side based on a horizontal component of the motion detected by said detector.

3. A video camera according to claim 2, wherein said detector includes an allocator which allocates a plurality of blocks forming a line in a vertical direction to the electronic image outputted from said imager, and a motion vector detector which individually detects motion vectors of a plurality of block images belonging to the plurality of blocks allocated by said allocator, and said inclination amount changer includes a function creator which creates a function for defining the inclination amounts based on horizontal components of the plurality of motion vectors created by said motion vector detector.

4. A video camera according to claim 3, wherein the number of blocks allocated by said allocator is determined based on an imaging cycle of said imager and a vibration frequency of said imaging surface.

5. A video camera comprising:

an imager which repeatedly outputs an electronic image produced on an imaging surface by an exposure operation of a focal-plane electronic shutter system in a raster scanning manner;

an extractor which extracts a partial image belonging to a designated area, out of the electronic image outputted from said imager;

an outputter which outputs a moving image based on the partial image extracted by said extractor;

a detector which detects motion of said imaging surface in a direction orthogonal to an optical axis;

a position changer which changes a position of the designated area so that the motion detected by said detector is compensated; and a shape changer which changes a shape of the designated area so that a focal plane distortion is restrained based on the motion detected by said detector, wherein said shape changer includes a first size changer which changes a vertical size of the designated area based on a vertical component of the motion detected by said detector, and said video camera further comprises a second size changer which changes a vertical size of the partial image extracted by said extractor in association with a changing process of said first size changer.

6. A video camera according to claim 5, wherein a change magnification of said second size changer is equivalent to an inverse number of a change magnification of said first size changer.

7. A computer program embodied in a tangible medium, which is executed by a processor of a video camera provided with:

an imager repeatedly outputs an electronic image produced on an imaging surface by an exposure operation of a focal-plane electronic shutter system in a raster scanning manner; an extractor which extracts a partial image belonging to a rectangular designated area having a left side and a right side, out of the electronic image outputted from said imager; an outputter which outputs a moving image based on the partial image extracted by said extractor; and a detector which detects motion of said imaging surface in a direction orthogonal to an optical axis, said program comprising:

a position changing step of changing a position of the designated area so that the motion detected by said detector is compensated; and an inclination amount changing step of changing inclination amounts of the right side and the left side so that a focal plane distortion in a horizontal direction is restrained based on a horizontal component of the motion detected by said detector.

8. An imaging control method executed by a video camera provided with: an imager which repeatedly outputs an electronic image produced on an imaging surface by an exposure operation of a focal-plane electronic shutter system in a raster scanning manner; an extractor which extracts a partial image belonging to a rectangular designated area having a left side and a right side, out of the electronic image outputted from said imager; an outputter which outputs a moving image based on the partial image extracted by said extractor; and a detector which detects motion of said imaging surface in a direction orthogonal to an optical axis, said imaging control method, comprising:

a position changing step of changing a position of the designated area so that the motion detected by said detector is compensated; and an inclination amount changing step of changing inclination amounts of the right side and the left side so that a focal plane distortion in a horizontal direction is restrained based on a horizontal component of the motion detected by said detector.

9. A computer program embodied in a tangible medium, which is executed by a processor of a video camera provided with: an imager which repeatedly outputs an electronic image produced on an imaging surface by an exposure operation of a focal-plane electronic shutter system in a raster scanning manner; an extractor which extracts a partial image belonging to a designated area, out of the electronic image outputted from said imager; an outputter which outputs a moving image based on the partial image extracted by said extractor; and a detector which detects motion of said imaging surface in a direction orthogonal to an optical axis, said program comprising:

a position changing step of changing a position of the designated area so that the motion detected by said detector is compensated; and a shape changing step of changing a shape of the designated area so that a focal plane distortion is restrained based on the motion detected by said detector, wherein the designated area is a rectangular area having a left side and a right side, and said shape changing step includes an inclination amount changing step of changing inclination amounts of the right side and the left side based on a horizontal component of the motion detected by said detector.

10. An imaging control method executed by a video camera provided with: an imager which repeatedly outputs an electronic image produced on an imaging surface by an exposure operation of a focal-plane electronic shutter system in a raster scanning manner; an extractor which extracts a partial image belonging to a designated area, out of the electronic image outputted from said imager; an outputter which ouputs a moving image based on the partial image extracted by said extractor; and a detector which detects motion of said imaging surface in a direction orthogonal to an optical axis, said imaging control method comprising:

a position changing step of changing a position of the designated area so that the motion detected by said detector is compensated; and a shape changing step of changing a shape of the designated are so that a focal plane distortion is restrained based on the motion detected by said detector, wherein the designated area is a rectangular area having a left side and a right side, and said shape changing step includes an inclination amount changing step of changing inclination amounts of the right side and the left side based on a horizontal component of the motion detected by said detector.

11. A computer program embodied in a tangible medium, which is executed by a processor of a video camera provided with: an imager which repeatedly ouputs an electronic image produced on an imaging surface by an exposure operation of a focal-plane electronic shutter system in a raster scanning manner; and extractor which extracts a partial image belonging to a designated area, out of the electronic image outputted from said imager; an outputter which outputs a moving image based on the partial image extracted by said extractor; and a detector which detects motion of said imaging surface in a direction orthogonal to an optical axis, said program comprising:

a position changing step of changing a position of the designated area so that the motion detected by said detector is compensated; and a shape changing step of changing a shape of the designated area so that a focal plane distortion is restrained based on the motion detected by said detector, wherein said shape changing step includes a first size changing step of changing a vertical size of the designated area based on a vertical component of the motion detected by said detector, and said program further comprises a second size changing step of changing a vertical size of the partial image extracted by said extractor in association with a changing process of said first size changing step.

12. An imaging control method executed by a video camera provided with: an imager which repeatedly outputs an electronic image produced on an imaging surface by an exposure operation of a focal-plane electronic shutter system in a raster scanning manner: an extractor which extracts a partial image belonging to a designated area, out of the electronic image outputted from said imager; an outputter which outputs a moving image based on the partial image extracted by said extractor; and a detector which detects motion of said imaging surface in a direction orthogonal to an optical axis, said imaging control method comprising:

a position changing step of changing a position of the designated area so that the motion detected by said detector is compensated; and a shape changing step of changing s shape of the designated area so that a focal plane distortion is restrained based on the motion detected by said detector, wherein said shape changing step includes a first size changing step of changing a vertical size of the designated area based on a vertical component of the motion detected by said detector, and said imaging control method further comprises a second size changing step of changing a vertical size of the partial image extracted by said extractor in association with a changing process of said first size changing step.

* * * * *